United States Patent
Daniel et al.

(10) Patent No.: US 8,692,157 B2
(45) Date of Patent: Apr. 8, 2014

(54) WELDING SYSTEM SEQUENCE CONTROL APPARATUS

(75) Inventors: Joseph Allen Daniel, Sagamore Hills, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2771 days.

(21) Appl. No.: 11/227,349

(22) Filed: Sep. 15, 2005

(65) Prior Publication Data

US 2007/0056942 A1    Mar. 15, 2007

(51) Int. Cl.
    *B23K 9/10*      (2006.01)

(52) U.S. Cl.
    USPC ..................... 219/130.5; 219/125.1

(58) Field of Classification Search
    USPC ................. 219/130.1, 130.5, 125.1
    See application file for complete search history.

(56) References Cited

U.S. PATENT DOCUMENTS

| | | | |
|---|---|---|---|
| 3,581,051 A | | 5/1971 | Brown et al. |
| 3,689,734 A | | 9/1972 | Burley et al. |
| 4,390,954 A | | 6/1983 | Manning |
| 4,631,700 A | | 12/1986 | Lapeyre |
| 5,206,474 A | | 4/1993 | Fukuoka et al. |
| 5,278,390 A | * | 1/1994 | Blankenship ............... 219/130.5 |
| 5,449,877 A | * | 9/1995 | Buda et al. ..................... 219/110 |
| 5,450,315 A | * | 9/1995 | Stefanski ......................... 700/48 |
| 5,773,779 A | | 6/1998 | Morlock |
| 5,837,968 A | * | 11/1998 | Rohrberg et al. .......... 219/130.1 |
| 5,850,066 A | * | 12/1998 | Dew et al. ..................... 219/109 |
| 5,859,847 A | * | 1/1999 | Dew et al. ..................... 370/389 |
| 5,877,468 A | | 3/1999 | Morlock |
| 6,002,104 A | | 12/1999 | Hsu |
| 6,023,044 A | | 2/2000 | Kosaka et al. |
| 6,087,627 A | | 7/2000 | Kramer |
| 6,115,273 A | | 9/2000 | Geissler |
| 6,133,545 A | | 10/2000 | Okazaki et al. |
| 6,151,640 A | * | 11/2000 | Buda et al. ...................... 710/11 |
| 6,278,074 B1 | | 8/2001 | Morlock et al. |
| 6,292,715 B1 | | 9/2001 | Rongo |
| 6,624,388 B1 | * | 9/2003 | Blankenship et al. ..... 219/130.5 |
| 6,700,097 B1 | | 3/2004 | Hsu et al. |
| 6,717,108 B2 | * | 4/2004 | Hsu ......................... 219/137 PS |

(Continued)

OTHER PUBLICATIONS

Wave Designer, Software for Waveform Control Technology, brochure.
Lincoln Welders NA-3 and NA-4, Automatic Welding Systems with Solid State Controls, brochure.
Power Feed 10M, Publication E8.266, Aug. 2004, brochure.
Power Wave 455 M & Power Wave 455 M/STT, Publication E5.161, Aug. 2004, brochure.

(Continued)

*Primary Examiner* — Henry Yuen
*Assistant Examiner* — Ayub Maye
(74) *Attorney, Agent, or Firm* — Hahn Loeser & Parks LLP

(57) ABSTRACT

Welding systems and sequence controllers therefor are presented for controlling components of a welding system during a welding operation. The sequence controller receives system inputs and provides control outputs to the system components, and includes a processing component, an executable sequence control program, and a state table file. The sequence control state table file includes a number of entries corresponding to welding operation states, where the individual entries comprise one or more instruction identifiers, instruction parameters, exit condition identifiers and corresponding next state identifiers. The sequence control program is executed according to the sequence controller inputs and according to the state table file to provide the sequence controller outputs, where the state table file can be easily modified or new state table files can be created and downloaded to the sequence controller to facilitate easy reconfiguration of a welding system.

22 Claims, 19 Drawing Sheets

(56) References Cited

U.S. PATENT DOCUMENTS

| | | |
|---|---|---|
| 6,734,394 B2 | 5/2004 | Hsu |
| 6,747,247 B2 | 6/2004 | Holverson et al. |
| 2002/0107825 A1 | 8/2002 | Manicke et al. |
| 2002/0117487 A1 | 8/2002 | Corby, Jr. et al. |

OTHER PUBLICATIONS

NA-5 Automatic Welding System, brochure.
Power Feed 10 Wire Drive & Control Box, Oct. 2003, Operator's Manual.

* cited by examiner

SEQUENCE CONTROLLER INPUTS

| | | | |
|---|---|---|---|
| Preflow Commands | Preflow Time<br>Preflow Rate | Burnback Commands | Burnback Arc Length<br>Burnback Duration |
| | | Postflow Commands | Postflow Time |
| Strike Commands | Strike OCV<br>Strike (Run In) WFS | | Postflow Rate |
| Start Commands | Start WFS<br>Start Arc Length<br>Start Arc Control<br>Start Duration<br>Upslope Duration<br>Start Gas Flow | Trigger Commands | Trigger Condition<br>2 / 4 step Operation<br>Triggered Memory Operation<br>A / B Multi Procedure |
| | | Operation | Cold Inch Wire Switch<br>Purge Gas Switch |
| Welding Commands | WFS<br>Arc Length<br>Arc Control<br>Duration<br>Welding Gas Flow | | Start / Stop Travel Switch<br>Start / Stop Water Coolant |
| | | Switch | Wire Feed Forward / Reverse |
| | | Travel Commands | Travel Energized |
| Crater Commands | Crater WFS<br>Crater Arc Length<br>Crater Arc Control<br>Crater Duration<br>Downslope Duration<br>Crater Gas Flow | | Travel Speed<br>Travel Method<br>Direction of Motion<br>Weaving Coordination |
| | | Power Source<br>Output Conditions | Average Current<br>Average Voltage<br>Arc Detect<br>Water Flow<br>Gas Flow<br>Fault |

| SEQUENCE CONTROLLER OUTPUTS | |
|---|---|
| Outputs to Power Source | Output On / Off |
| | Work Point |
| | Arc Length |
| | Arc Control |
| Outputs to Wire Feeder | Wire Feed On / Off |
| | Forward / Reverse |
| | Wire Feed Speed |
| Outputs to Accessory Equipment | Energize Gas Solenoid |
| | Set Gas Flow Rate |
| | Energize Coolant Solenoid |
| | Energize Accessory Device |
| | Energize Travel Carriage |
| | Travel Direction |
| | Travel Speed |
| | Actuate Fume Extractor |

| STATE TABLE FILE 1 | | |
|---|---|---|
| S1 / INSTRUCTION(S) 104 | PARAMETER(S) FOR INSTRUCTION(S) 106 | |
| CONDITION 1 | NEXT STATE FOR CONDITION 1 | ACTION FOR CONDITION 1 |
| ⋮ 108 | ⋮ 110 | ⋮ 112 |
| CONDITION J | NEXT STATE FOR CONDITION J | ACTION FOR CONDITION J |
| 108 | 110 ⋮ | 112 |
| SL / INSTRUCTION(S) 104 | PARAMETER(S) FOR INSTRUCTION(S) 106 | |
| CONDITION 1 | NEXT STATE FOR CONDITION 1 | ACTION FOR CONDITION 1 |
| ⋮ 108 | ⋮ 110 | ⋮ 112 |
| CONDITION K | NEXT STATE FOR CONDITION K | ACTION FOR CONDITION K |
| 108 | 110 | 112 |

(braces labeled 102)

| STATE | CONDITIONAL CHECKS | | | |
|---|---|---|---|---|
| 1 IDLE | IF | TRIGGER | = | 1 |
|  | GOTO | 2 PREFLOW | | |
| RESET TIMER | | | | |
| T1   T2   T3   T4   T5 | 2 | | | |
| INSTRUCTION | | | | |
| MACHINE OFF | 3 | | | |
| WFS = 0 | | | | |
| VOLTS = 0 | 4 | | | |
| GAS = 0 | | | | |
| | 5 | | | |

| STATE | CONDITIONAL CHECKS | | | |
|---|---|---|---|---|
| 2 PREFLOW | IF | TIMER 1 | >= | PREFLOW TIME |
|  | GOTO | 3 STRIKE | | |
| RESET TIMER | | | | |
| T1   T2   T3   T4   T5 | IF | TRIGGER | = | 0 |
| | GOTO | 1 IDLE | | |
| INSTRUCTION | | | | |
| MACHINE OFF | 3 | | | |
| WFS = 0 | | | | |
| VOLTS = 0 | 4 | | | |
| GAS = 1 | | | | |
| | 5 | | | |

| STATE | CONDITIONAL CHECKS | | | |
|---|---|---|---|---|
| 3 STRIKE | IF GOTO | ARC DETECT | = | 1 |
| | | 4 START | | START TRAVEL |
| RESET TIMER | | | | |
| T1  T2  T3  T4  T5 | IF GOTO | TRIGGER | = | 0 |
| | | 1 IDLE | | |
| INSTRUCTION | | | | |
| REGULATE OUTPUT | 3 | | | |
| WP = RUN IN | | | | |
| VOLTS = OCV | 4 | | | |
| GAS  1 | | | | |
| | 5 | | | |

| STATE | CONDITIONAL CHECKS | | | |
|---|---|---|---|---|
| 4 START | IF GOTO | TIMER 1 | >= | START TIME |
| | | 5 WELD | | |
| RESET TIMER | | | | |
| T1  T2  T3  T4  T5 | IF GOTO | TRIGGER | = | 0 |
| | | 6 CRATER | | |
| INSTRUCTION | | | | |
| REGULATE OUTPUT | IF GOTO | ARC DETECT | = | 0 |
| | | 3 STRIKE | | STOP TRAVEL |
| WFS = START W | | | | |
| VOLTS = START VOLTS | 4 | | | |
| GAS  1 | | | | |
| | 5 | | | |

| STATE | CONDITIONAL CHECKS | | | |
|---|---|---|---|---|
| 5 WELD | IF | WELD TIME | = | 0 |
|  | GOTO | 6 CRATER | | |
| RESET TIMER | | | | |
| T1   T2   T3   T4   T5 | AND | TRIGGER | = | 0 |
|  | | | | |
| INSTRUCTION | | | | |
| REGULATE OUTPUT | IF | TIMER 1 | >= | WELD TIME |
|  | GOTO | 6 CRATER | | |
| WP = WELD WFS | | | | |
| VOLTS = WELD VOLTS | AND | WELD TIME | >= | 0 |
|  | | | | |
|  | | | | |
| GAS   1 | IF | ARC DETECT | = | 0 |
|  | GOTO | 3 STRIKE | STOP TRAVEL | |

| STATE | CONDITIONAL CHECKS | | | |
|---|---|---|---|---|
| 6 CRATER | IF | TIMER 1 | >= | CRATER TIME |
|  | GOTO | 7 BURN BACK | STOP TRAVEL | |
| RESET TIMER | | | | |
| T1   T2   T3   T4   T6 | IF | TRIGGER | = | 1 |
|  | GOTO | 5 WELD | | |
| INSTRUCTION | | | | |
| REGULATE OUTPUT | IF | ARC DETECT | = | 0 |
|  | GOTO | 8 POSTFLOW | STOP TRAVEL | |
| WP = CRATER WFS | | | | |
| VOLTS = CRATER VOLTS | 4 | | | |
|  | | | | |
| GAS   1 | 5 | | | |

| STATE | | CONDITIONAL CHECKS | | |
|---|---|---|---|---|
| 7 BURNBACK | IF | TIMER 1 | >= | BURNBACK TIME |
| | GOTO | 8 POSTFLOW | | |
| RESET TIMER | | | | |
| T1   T2   T3   T4   T5 | IF | TRIGGER | = | 1 |
| | GOTO | 5 WELD | | |
| INSTRUCTION | | | | |
| REGULATE OUTPUT | IF | ARC DETECT | = | 0 |
| | GOTO | 8 POSTFLOW | | |
| WFS = 0 | | | | |
| VOLTS = CRATER VOLTS | 4 | | | |
| GAS   1 | | | | |
| | 5 | | | |

| STATE | | CONDITIONAL CHECKS | | |
|---|---|---|---|---|
| 8 POSTFLOW | IF | TIMER 1 | >= | POSTFLOW TIME |
| | GOTO | 1 IDLE | | |
| RESET TIMER | | | | |
| T1   T2   T3   T4   T5 | IF | TRIGGER | = | 1 |
| | GOTO | 3 STRIKE | | |
| INSTRUCTION | | | | |
| MACHINE OFF | 3 | | | |
| WFS = 0 | | | | |
| VOLTS = 0 | 4 | | | |
| GAS   1 | | | | |
| | 5 | | | |

FIG. 10H

WELDING SYSTEM SEQUENCE CONTROL APPARATUS

FIELD OF THE INVENTION

The present invention relates generally to arc welding, and more particularly to improved apparatus for sequence control in welding systems.

INCORPORATION BY REFERENCE

Blankenship U.S. Pat. No. 5,278,390; Morlock U.S. Pat. No. 6,278,074; and Holverson U.S. Pat. No. 6,747,247 are hereby incorporated by reference herein as background information

BACKGROUND OF THE INVENTION

Welding systems typically include a number of system components, such as power sources, wire feeders, travel carriages, gas and/or coolant supplies and associated controls, fume extraction equipment, etc. Beginning with the introduction of the POWER WAVE 450 inverter based arc welding supply in 1995 by The Lincoln Electric Company of Cleveland, Ohio, welding power sources have been developed where the power source inverter output waveform (or weld mode) is controlled using state table concepts to create programmable output waveforms as a series of segments or states, with transitions between states being determined according to current system conditions and a state transition table. POWER WAVE is a trademark of the assignee of the present invention. This state based control of the power source output provides a user with the ability to tailor various aspects of the welding signal applied to a specific process or application, using WAVEFORM CONTROL TECHNOLOGY, another trademark of the assignee. Various aspects of Lincoln's advanced programmable power source technology are set forth in Blankenship U.S. Pat. No. 5,278,390, which describes a system with a number of digital state tables stored in memory for controlling a welding cycle of an arc welder. The power source state tables include coded welding parameters indicating a selected function of a specific welding cycle, where a given state is performed and completed before the next state is processed, until a total welding waveform cycle is performed. The weld power source controller of Blankenship U.S. Pat. No. 5,278,390 converts the selected function of a specific digital state in the state table into welding parameters at the output of the welder operated by the weld controller. Since the POWERWAVE 450 welding power source products were introduced in the 1990's, The Lincoln Electric Company has produced a large number of welding power source products that feature state based waveform controllers. The POWER WAVE series of welding supplies, moreover, has been successfully used to generate welding power source waveforms tailored for a variety of welding process types, such as shielded metal arc welding (SMAW), gas tungsten arc welding (GTAW, also referred to as tungsten inert gas (TIG) welding), plasma arc welding (PAW), Gas metal arc welding (GMAW, also known as metal inert gas (MIG) welding), pulsed MIG welding (GMAW-P), self-shielded flux-cored arc welding (FCAW-S), gas-shielded flux-cored arc welding (FCAW-G), submerged arc welding (SAW), variable polarity gas tungsten arc welding (VPG-TAW), carbon arc gouging, pulsed TIG welding (GTAW-P), etc.

The welding waveform definitions or characteristics of the Lincoln POWER WAVE sources are stored in the form of a software "welding program", which includes three basic components. A state table defines the logic used to produce the desired output waveform, and a data table, such as a spreadsheet, defines how the state table logic is modified or adjusted to function across a range of operation. One or more "adaptive loops" may also be employed to acquire actual information about the welding system and to make changes to the waveform to adapt for changes in the welding system in closed loop fashion. Along with the introduction of the POWER WAVE power sources, Lincoln Electric has developed and provided proprietary software known as "Weld Development" that allows a welding professional to specify a series of waveform segments or modes to program the POWER WAVE products. The Weld Development software allows a user to enter parameters and instructions into a welding waveform states to create the state table, and to specify the ranges in the data table. These state based POWER WAVE power sources and the waveforms thereof may also be customized using Lincoln Electric's WAVE DESIGNER software, where WAVE DESIGNER is also a trademark of the assignee.

Sequencers or sequence controllers monitor the status of a welding process and provide control outputs to one or more welding system components to perform a welding operation, and typically include event driven controls to adjust various aspects of a welding cycle. Early examples of welding system sequence controllers include the NA-3, NA-4, and NA-5 automatic controller products produced and marketed by Lincoln Electric since the late 1970's, featuring various adjustments to control a sequence of events such as pre-ignition, starting, welding, crater, and post-weld in a weld cycle. The NA-5 sequencer, for example, is hardware configurable to provide adjustments for: pre-ignition settings of wire feed speed (WFS) and open circuit voltage (OCV); starting segment settings of wire feed speed, voltage, and a start time; welding settings of wire feed speed, voltage, and an optional weld time; crater state settings of wire feed speed, voltage and a crater time; and post weld cycle settings for burnback time. Using this type of sequencer, a welding sequence is adjustable using a series of knobs and switches hard wired into a dedicated controller. In general, these early sequence controls implemented a generally fixed sequence of pre-defined welding system conditions with limited user adjustment of certain operating parameters (e.g., welding voltage, wire feed speed, predefined time periods, etc.) using panel mounted control adjustment knobs, where only limited changes could be made to the ordering of the system conditions, and such changes required reconfiguration of hardware wiring within the product (e.g., using jumperwires, DIP switches, etc.). More recently, improved sequence controllers have been developed, such as the POWERFEED 10 series controller offered by The Lincoln Electric Company, in which an electronic link is provided between the user controls and the associated function, where the links are typically hard coded into the machine's operating firmware or software. POWER FEED is a trademark of the assignee of the present invention. In order to modify the sequence of events or system conditions controlled by the sequencer, a firmware revision is typically required, in which control code written in C++ or other programming language must be modified, recompiled, de-bugged, and installed in the sequence controller. Thus, while such second generation sequence controller designs provide some level of improvement compared with their hardware based predecessors, the basic functionality is nevertheless predefined and difficult to modify, particularly by welding system operators. Consequently, present welding system sequence controllers do not allow easy refinement of welding processes or straightforward adaptation of a welding system to different welding operations.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to improved sequence control apparatus for welding systems and configuration tools therefor, in which reprogrammable sequence control provides the advantages of state based welding power supplies to control of welding operations. Welding systems and reprogrammable sequence controllers are provided, with the sequence controller having a processing component, a sequence control program, and a sequence control state table file, where the welding system operation can be easily reconfigured or modified by modifying or downloading table files without the need to reposition hardware jumpers or switches, and without having to recompile firmware or software. The invention may thus be advantageously employed to provide welding systems in which the overall welding operation can be fine tuned or tailored for a specific application without requiring C++ or other software expertise and associated compilers to change sequencer firmware. Instead, the invention facilitates straight-forward entry or adjustment of parameters, conditions, functions, etc. that are easily understood by welding personnel, where the resulting modified or new sequence control state table file can be quickly stored in memory (e.g., downloaded to a sequence controller) without recompiling executable code. A user can define each segment or state of an overall welding operation by selecting functions or instructions for each state that determine an output signal that the sequencer applies to a welding system component. For instance, a regulate function can be specified for a particular state that sends a command (e.g., control output value) to the power source to control the welding signal (e.g., voltage, current) to a particular work point (WP), or that provides a wire feed speed (WFS) value to a wire feeder motor, where the power source output is a function of the wire feed speed value. In addition, the user can specify the conditions under which each state ends, and the next state to which the sequence controller will branch. Moreover, the parameter values may be entered for each state as constants, or the setup may effectively link a state parameter to a user accessible knob or other user interface adjustment.

In accordance with one or more aspects of the invention, a welding system is provided, having two or more system components including a power source that provides a welding signal to a welding process, and a reprogrammable sequence controller. The sequence controller receives inputs from one some or all of the system components and provides outputs to perform a welding operation. A processing component is included in the sequence controller, along with a sequence control program that is executable by the processing component, and one or more sequence control state table files are provided which are accessible by the processing component. The state table files include a plurality of entries, each of which corresponds to a segment or state of a welding operation, where the control program is executed in accordance with the state table file entries and the current sequencer inputs to perform a multiple state welding operation as a series of states. By this unique architecture, any particular welding operation can be effectively represented as a number of entries in a state table file, and a somewhat generic executable sequence control program can interpret the appropriate instructions or routines to be executed for a given operational state according to the state table entries. One particular advantage of the present invention lies in the ability to reprogram the operation of a welding system by simply modifying an existing state table file or creating a new table file and storing the same in a data store accessible by the processing component. This can be done using a configuration tool, such as a software program on a laptop or desktop computer, PDA, Ethernet network connection, cell phone, blackberry, wireless communications device, etc., or configuration may be done via a user interface and a configuration tool integrated into a system component (e.g., wire feeder, power source, sequence controller, etc.), where the sequence control program need not be recompiled or otherwise modified. Once the state table file is stored, the executable sequence control program is executed, with the current system inputs being obtained along with a current state table file entry.

Each state table file entry is essentially the shell providing an instruction indicator or identifier telling the executable control program what instructions or routines are to be executed, along with one or more parameters and conditional checks with corresponding next state branch indicators. The state table entries individually define one segment of the weld cycle and one or more states are combined in a logical sequence that defines the entire weld cycle, where the conditional check(s) associated with each state entry determine the conditions under which each state is completed and which state entry will be the next system state. One or more instruction identifiers are provided in each state table entry, which identify an executable instruction or routine of the sequence control program, and corresponding instruction parameters are provided, for example, where the instruction identifier may indicate that the sequence control program is to regulate the welding power source output to a work point value specified by the parameter found in the state table file entry or a value provided at a user interface knob in the system. The processing component generates the sequence controller outputs accordingly, for instance, by providing appropriate control signals to the power source, wire feeder, etc., to effectuate the specified function(s) of the current state. The table file entries also include at least one exit condition identifier corresponding to a welding system condition, along with a next state identifier indicating a next entry corresponding to the exit condition identifier. In this manner, the state based system operation can branch to appropriate states depending on current system conditions (e.g., determined by the current sequencer inputs, timer conditions, etc.), whereby the state table file may be constructed to account for any number of situations possible in a welding operation. In one implementation illustrated and described below, the processing component obtains a current sequence control state table file entry from the table file, obtains the current inputs from the welding system components, and executes one or more executable instructions or routines of the sequence control program identified by an instruction identifier of the current entry using an instruction parameter of the current entry to provide the sequence controller outputs. In addition, the processing component determines whether a welding system condition identified by an exit condition identifier of the current table file entry is satisfied according to the current sequence controller inputs, and if so, selectively obtains a next sequence control state table file entry corresponding to the exit condition identifier. The entry may also include an optional action identifier corresponding to the exit condition identifier, where the action identifier identifies an executable instruction or routine of the sequence control program that is executed if the specified exit condition has been satisfied.

Other aspects of the invention relate to tools for configuring a welding system sequence controller, with a user interface for rendering state table file entries to a user, where the sequence control state table file entries individually include an instruction identifier, a corresponding instruction parameter, an exit condition identifier, and a next state identifier, and the tool allows the user to modify the entries to create or modify a sequence control state table file and to store the sequence control state table file. In one embodiment, the user interface comprises a display, such as a graphic display or other display integrated into a welding power source or wire feeder, where the display renders individual sequence control state table file entries to the user, and the user is allowed to select the instruction identifier, to set the instruction parameter or to link the instruction parameter with an adjustable user interface control component, to set the exit condition identifier, and to set the next state identifier for each the sequence control state table file entry.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which:

FIG. 3 illustrates exemplary sequence controller inputs in the welding system of FIGS. 1A-2D;

FIG. 4 illustrates exemplary sequence controller outputs in the system of FIGS. 1A-2D;

FIG. 5 illustrates an exemplary state table file in the sequence controller of FIGS. 1A-2D;

FIGS. 10A-10H are exemplary user interface renderings of MIG welding operation states for the exemplary MIG welding operation of FIGS. 7-9.

DETAILED DESCRIPTION OF THE INVENTION

Figure 1A:
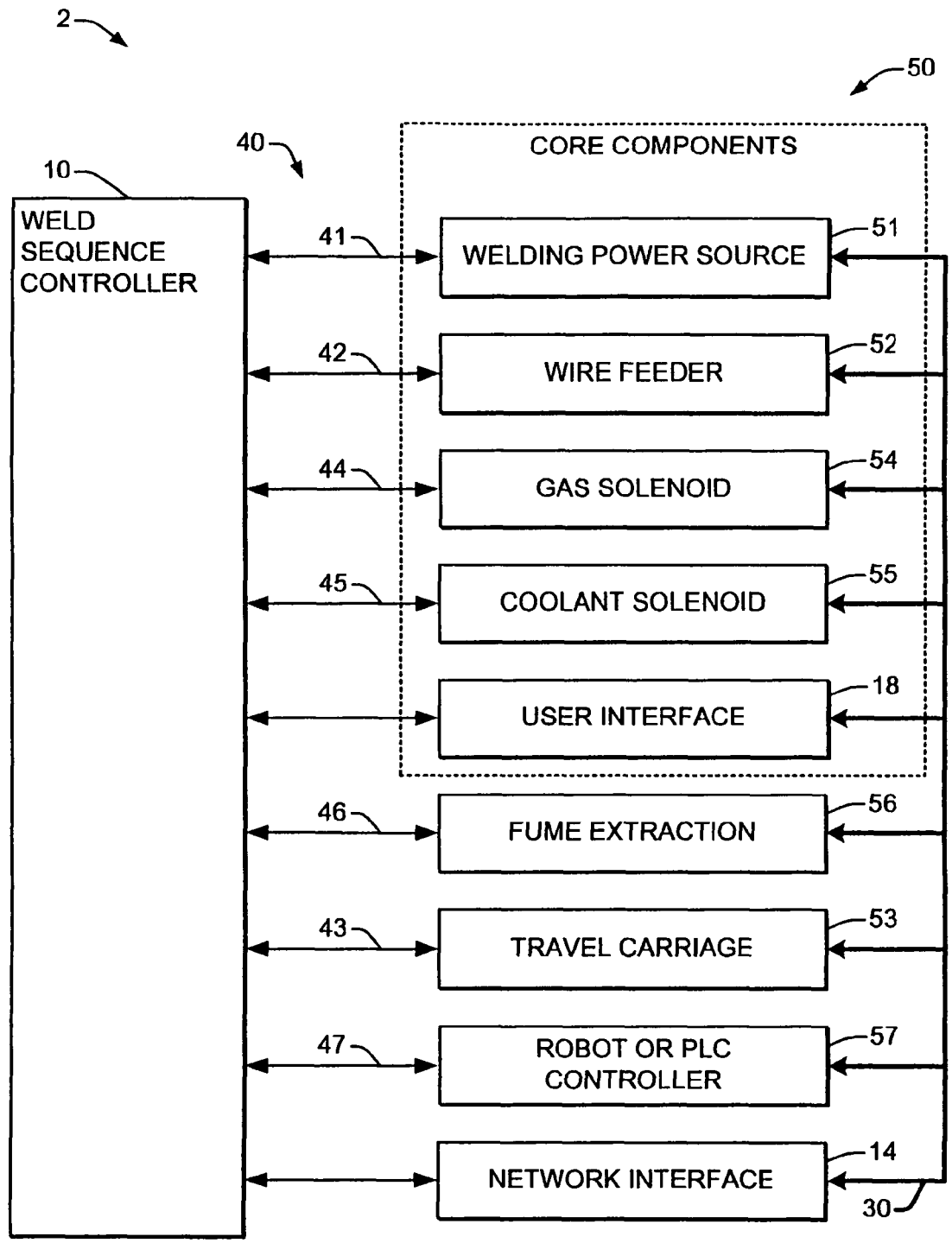
FIG. 1A is a system diagram illustrating an exemplary welding system with a reprogrammable sequence controller in accordance with one or more aspects of the present invention.

One or more embodiments or implementations of the present invention are hereinafter described in conjunction with the drawings, wherein like reference numerals are used to refer to like elements throughout and wherein the illustrated structures are not necessarily drawn to scale. The invention relates to controlling the sequence of welding operations in a welding system, where easily reprogrammable sequence controllers allow system reconfiguration without recompiling executable code or hardware modifications. The various aspects of the invention are generally applicable to welding systems, which as used herein, refers to systems that may be used to perform welding operations, cutting operations (e.g., plasma cutters, etc.), or other forms of arc processing. Thus, while illustrated and described below in the context of specific welder examples, the invention is not limited to the illustrated examples.

Referring initially to FIGS. 1A-2D, an exemplary arc welding system 2 is illustrated in which one or more aspects of the invention may be carried out. The system 2 includes a plurality of welding system components 50, including a power source 51, a wire feeder 52, a travel carriage 53, a gas solenoid 54, a coolant solenoid 55, a fume extraction system 56, and a robot or programmable logic controller (PLC) 57, where the illustrated system components 50 are merely examples and a system may be provided with more or fewer components in accordance with the present invention. As described in further detail below, one suitable power source 51 is a POWER WAVE type (FIGS. 2A-2D) from The Lincoln Electric Company in which the welding signal waveform (the electrical output provided to the welding process) is controlled according to state table control principles, although any power source may be used which operates to provide a welding signal 91 (e.g., current, voltage) to a welding process 90 (FIGS. 2A and 2C) suitable for performing an arc processing (welding, cutting, etc.) operation. The system 2 further comprises a sequence controller (sequencer) 10 with a microprocessor 12, a sequence control program 22, and one or more state table files 24,26,28, where the illustrated sequence controller 10 also provides various interfaces 14-18 including a network interface 14 for operatively coupling the sequencer 10 with a network 30, one or more dedicated communications interfaces 16 providing direct communications connectivity with one or more of the system components 50 via cables 40, as well as a user interface 18 that provides operator or user access to the sequencer 10 for setting parameters, values, etc., and/or for rendering operational information to a user. As shown in FIG. 1A, the network 30 may couple one or more of the system components 50 and the sequencer 10 with one another and may also provide for data sharing and other information exchange between any of the components 10,50, and external devices or other networks (not shown). Alternatively or in combination, moreover, dedicated cabling 40 may be used to interconnect the sequencer 10 with some or all of the welding system components 50, such as power source control cable 41, wire feeder cable 42, travel carriage cable 43, gas control cable 44, coolant solenoid control cable 45, fume extractor control cable 46, and/or a robot or PLC cable 47, wherein the interfacing via the network 30 (and network interface 14) and/or the cables 40 (and interfaces 16) provide for exchange of data or other information, signaling, messages, etc., by which sequence control inputs 21 can be obtained from one or more system components 50 and sequence control outputs 23 can be provided to one or more of the components 50.

In one possible implementation, the processor 12 is a microprocessor, microcontroller, DSP, programmable logic device, etc., although any form of computational processing component may be employed within the scope of the invention, whether hardware, software, firmware, or combinations thereof, and which may be a single device or may be implemented in multiple components. It is further noted that the sequencer 10 may be integrated into one of the system components 50, such as power source 51, wire feeder 52, etc., wherein the user interface 18 may include one or more display devices, user control knobs, switches, keypads, etc. (FIGS. 11A-11C below), and may interface a user with specifics of the system component 50 as well as those of the sequence controller 10. Sequencer 10, moreover, includes a memory 20, which may be any suitable data store, integrated or distributed, which is operatively coupled with the processor 12 to allow access by the processor 12 to files, programs, instructions, routines, data, etc. stored in the memory 20. It is noted that while the processing component 12 and the memory 20 may be integrated in one component, such as a unitary circuit board, these elements may be separately provided or distributed across multiple system components to provide a welding system sequence controller 10 within the scope of the invention. The illustrated memory 20 stores the sequence control program 22 and the state table files 24, 26, 28 providing access thereto by the processor 12. The memory 20 may also include a sequence configuration tool 29, such as a software program that may also be executed by the processor 12.

Figure 2A:
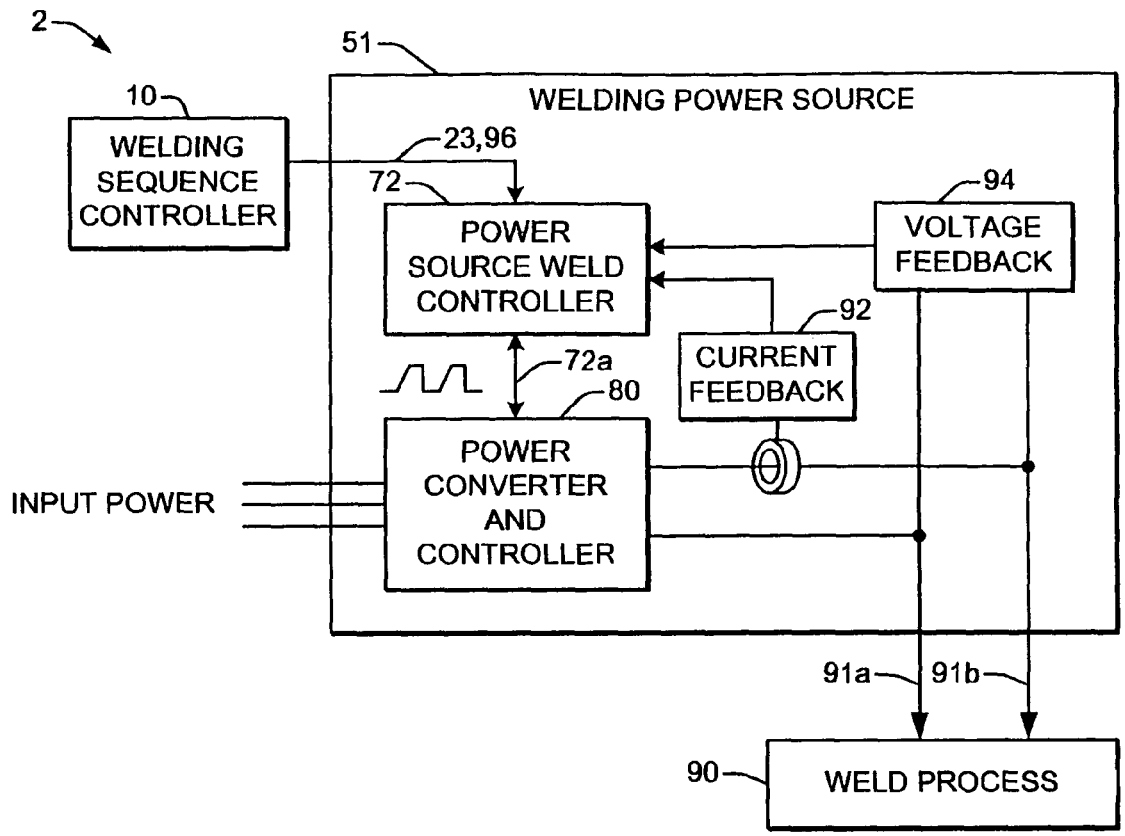
FIGS. 2A-2D are system and flow diagrams illustrating further details of a welding power source in the system of FIGS. 1A and 1B.
Figure 2B:
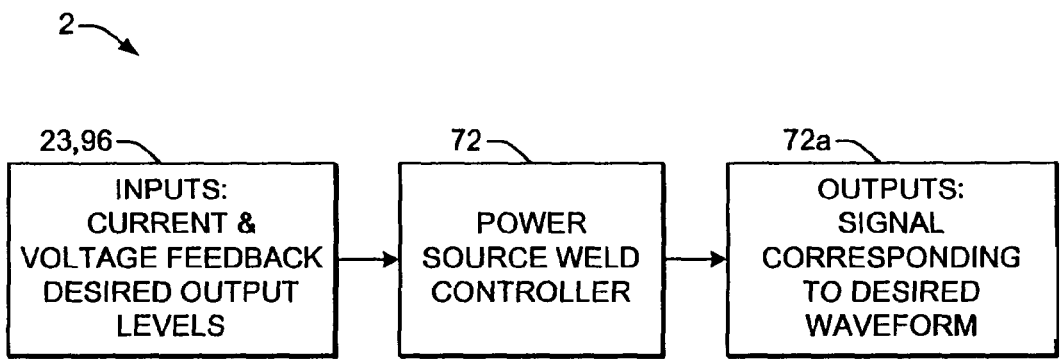
Figure 2C:
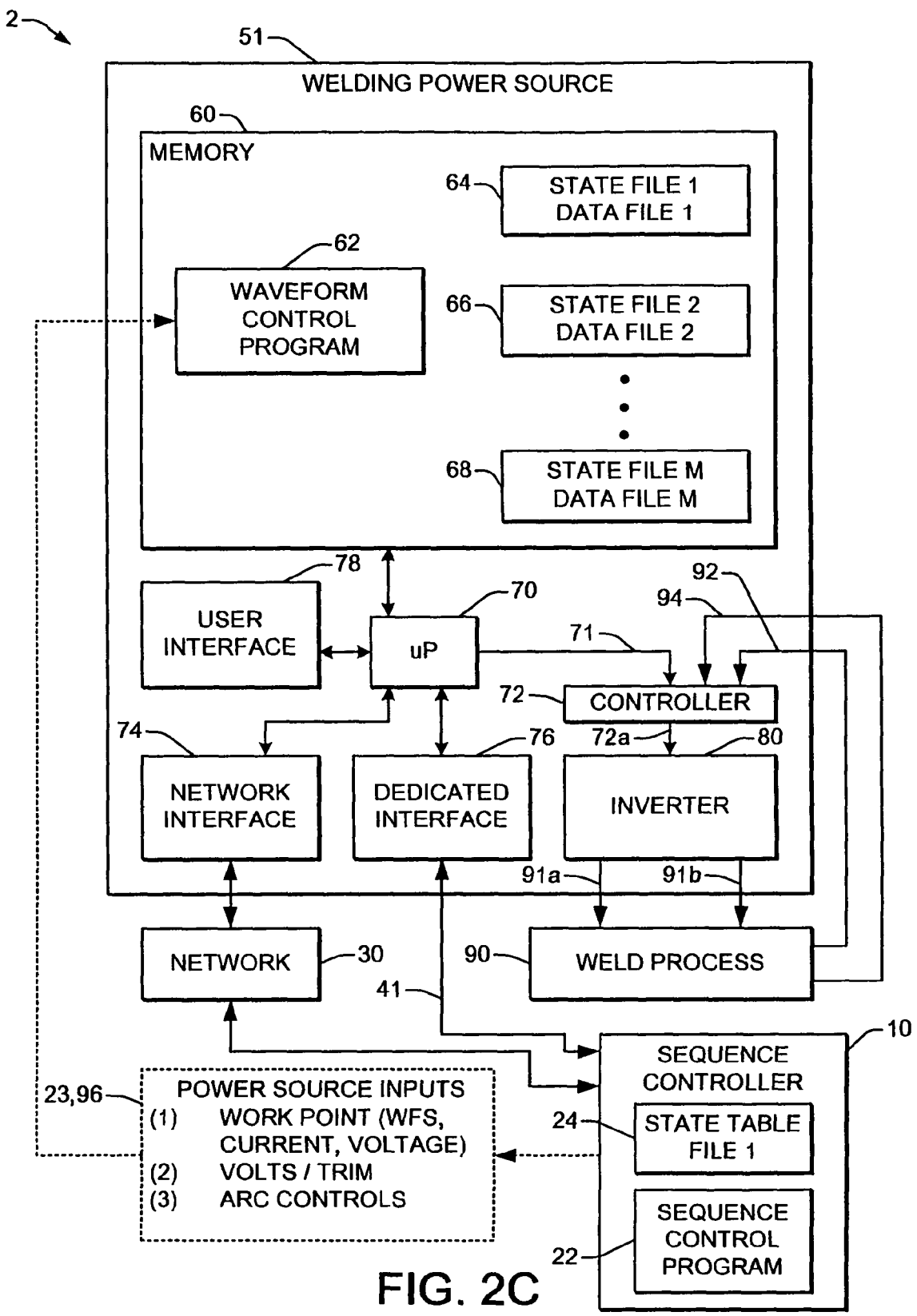

As further shown in FIGS. 2A-2D, the exemplary power source 51 is a state table based switching power source, wherein certain of the sequence controller outputs 23 are provided as inputs 96 to the power source 51 and a waveform control program 62 thereof (FIG. 2C). As best shown in FIG. 2A, the power source weld controller 72 defines and regulates the output waveform of the power source by providing control signals to a power converter and controller 80, where the output waveform can be a pulse type, a steady state value (e.g., for constant voltage (CV) control), or any other form. Referring also to FIG. 2B, in operation, sequence controller 10 provides a desired output level or levels as one or more sequence controller outputs 23 (power source inputs 96) to the weld controller 72, which employs the desired output level(s) and the current and voltage feedback 92 and 94 to define and regulate the desired output waveform by sending one or more output signals 72a corresponding to the desired waveform. The weld controller 72 can be implemented in any suitable fashion, including for example, analog circuits such as Lincoln's DC-400, or microprocessor based circuitry such as the Lincoln POWERWAVE series, in which the weld controller 72 includes a microprocessor 70 executing a state table based program 62 (FIG. 2C). The microprocessor 70 executes a standard routine (FIG. 2D below), reading each state, regulating the instruction(s) associated with the current state, and determining whether a series of conditional checks is true and if so, branching to the next state.

As best shown in FIG. 2C, the exemplary power source 51 includes a processor 70 operatively coupled with a memory 60, in which various waveform state files 64, 66, 68 and corresponding data files are stored for controlling the output waveform at output terminals 91a, 91b of an inverter type power source 80. Processor 70 runs the waveform control program 62 of memory 60 in accordance with a selected waveform state file 64,66,68 and a corresponding data file and provides a control signal or messages 71 to a controller 72, which in turn provides one or more control signals 72a that control operation of switching components within inverter 80 to provide the welding signal 91 to welding process 90, wherein controller 72 may control the inverter 80 in closed loop fashion according to one or more feedback signals 92, 94 (e.g., welding current, welding voltage, etc.) obtained from sensors (not shown) associated with the process 90 or directly from sensors associated with the output of inverter 80. Power source 51 also includes a network interface 74 for operative coupling of processor 70 with sequencer 10 via network 30, as well as a dedicated control cable interface 76 for connecting processor 70 to sequencer 10 (e.g., using cable 41), and the power source 51 may include a user interface 78 by which power source parameters may be monitored and/or through which a user may adjust various power source settings. The network interface 74 and/or dedicated interface 76 provide for operational coupling of sequence controller 10 with the power source 51, although any suitable interfacing and connection (e.g., wired or wireless) may be used by which sequence controller 10 and power source 51 may exchange data or other information with one another and/or with other welding system components 50.

Figure 2D:
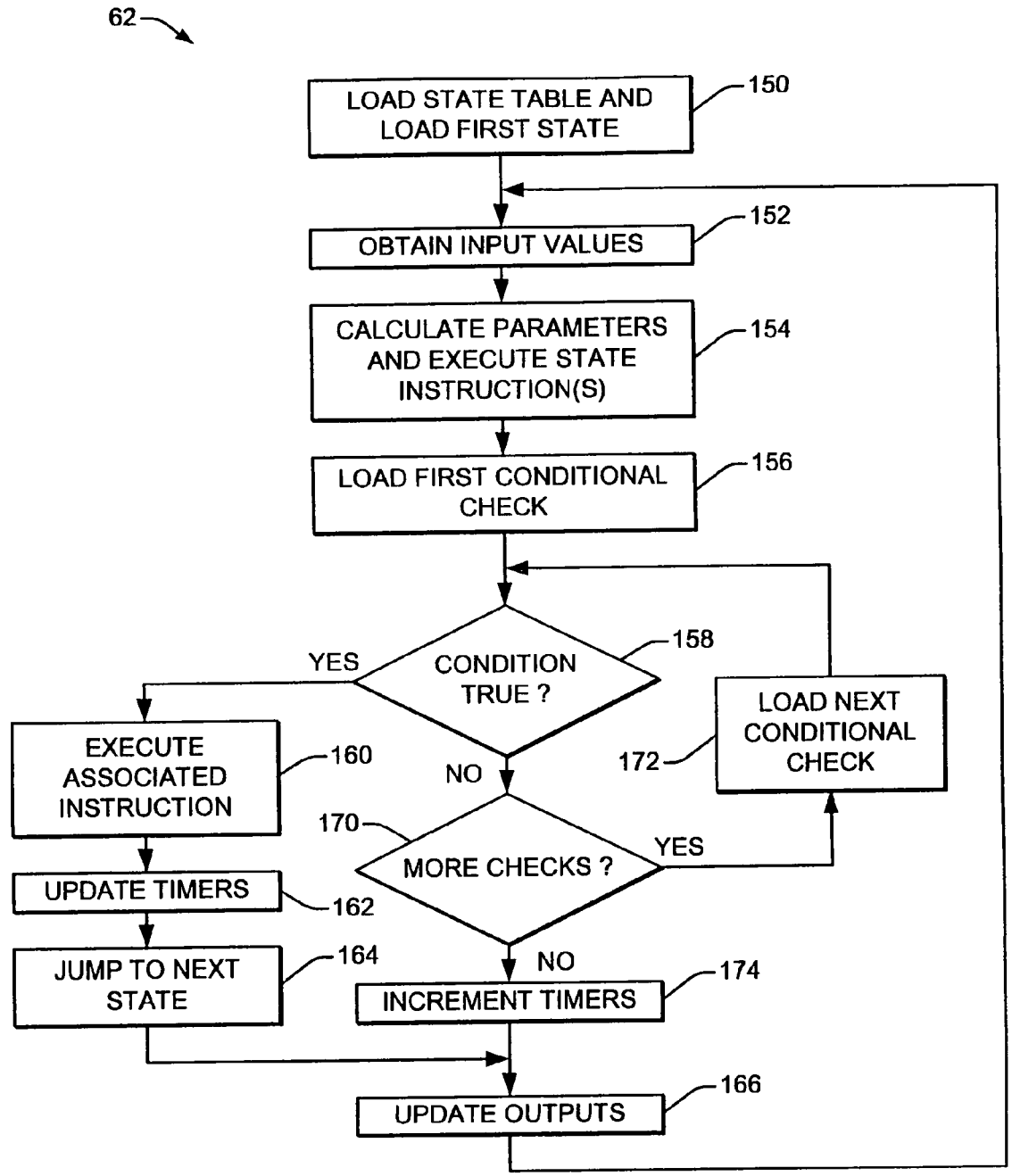

FIG. 2D illustrates the operation of the waveform control program 62 in the power source 51, wherein a first state table and data table are loaded at 150 and input values are obtained at 152. Parameters are calculated and state instructions are executed at 154, whereafter a first conditional check is loaded at 156 and tested (e.g., TRUE or FALSE) at 158. If the first condition is true (YES at 158), the program 62 executes the associated instruction at 160, updates times at 162, and jumps to the corresponding next state at 164, after which the power source outputs are updated at 166 and the program 62 returns to 152. If the first tested condition is not true (NO at 158), a determination is made at 170 as to whether more checks are specified for the current state, and if so (YES at 170), the next conditional check is loaded at 172, and the program tests the new condition at 158 as described above. Once all conditional checks have been found untrue for the current state (NO at 170), the program 62 updates the timers at 174, updates the outputs at 166, and then returns again to 152 as described above.

Referring also to FIGS. 3 and 4, unlike the state based power source controls of prior welding power sources, the sequence controller 10 is configured to receive one or more sequence controller inputs 21 (FIGS. 1B and 3) from one or more of the welding system components 50 and also provides one or more sequence controller outputs 23 thereto (FIGS. 1B and 4), wherein exemplary inputs 21 and outputs 23 may be transferred through any suitable information exchange means, such as network messaging across network 30, digital or analog signaling in one or more of the system control cables 40, wireless communications between components 50 and sequencer 10, etc. A sequencer input 21 can be any signal, message, data, information, or other means which the sequence controller 10 can obtain from a welding system component 50 indicating an operational condition associated with the system 2 or a welding operation being performed thereby. In this regard, the sequence control inputs 21 may be derived from welding system components 50 including one or more user interface controls (e.g., knobs, switches, etc.) by which a user can adjust timer values, voltages, currents, wire speeds, etc.

FIG. 3 shows an exemplary listing of possible sequence controller inputs 21, including various settings, values, etc. associated with various stages or states in a metal inert gas (MIG) welding operation or process. In general, the sequencer inputs may include user adjusted parameters, preferences, and/or a current condition of a system component 50 (e.g., output on/off, travel carriage movement, etc.) One state of the exemplary MIG process provides for initial shielding gas flow (e.g., gas solenoid 54 ON in FIG. 1A) with the power source 51 OFF (e.g., output voltage zero), wherein the sequence controller 10 obtains corresponding Preflow Commands or inputs including a Preflow Time value (e.g., in seconds, minutes, etc.) and a Preflow Rate (e.g., gas flow rate). Subsequently, a welding arc is generated in a strike state, in which the sequencer 10 may obtain input values 23 corresponding to Strike OCV (desired open circuit voltage regulation point) and a corresponding Run In wire feed speed (WFS). Once an arc has been established, a start state is entered, in which the sequence controller 10 may be provided with inputs 21 specifying Start WFS, Start Arc Length, Start Arc Control, Start Duration, Upslope Duration, and Start Gas Flow rate. Once a primary welding state is underway, the sequence inputs 21 may include welding WFS, Arc Length, Arc Control, Weld state Duration, and Welding Gas Flow values, and in a subsequent crater fill state the sequencer 10 may input Crater WFS, Crater Arc Length, Crater Arc Control, Crater Duration, Downslope Duration, and Crater Gas Flow values. It is noted at this point that the inputs 21 illustrated in FIG. 3 and described herein are exemplary only, and are not exhaustive of the possible sequence controller inputs possible in a given implementation of the invention. Following crater fill, a burnback state allows a portion of the welding wire to be consumed with slow or zero wire feed speed, wherein sequencer 10 may obtain inputs 21 related to Burnback Arc Length, Burnback Duration, Postflow Commands, Postflow Time, and Postflow Rate. During the welding operation, moreover, the sequence controller can monitor the status of an operator trigger, such as a manual trigger located on a welding torch or gun, a floor mounted footswitch trigger control actuator, etc., which provides the sequencer 10 with an input (e.g., Boolean in one example) indicative of the Trigger Condition. Other trigger related sequence control inputs can include indication of whether 2 or 4 step Trigger Operation is being used, Triggered Memory Operation, A/B Multi Procedure Operation, Cold Inch Wire Switch, Purge Gas Switch, Start/Stop Travel Switch, Start/Stop Water Coolant Switch, and Wire Feed Forward/Reverse, for example. Inputs may also be obtained by sequencer 10 relative to different system components 50, such as the travel carriage 53, including Travel Energized indications, Travel Speed input, a Travel Method, travel motion direction input, and/or a Weaving Coordination input. With respect to the power source 51, moreover, the source 51 or sensors associated therewith may provide input information to sequencer 10 related to current output conditions, including Current and/or Voltage values, whether an arc has been detected, water and/or gas flow rates, and/or fault indications.

FIG. 4 shows an exemplary set of sequencer outputs 23 that are used to coordinate one or more of the welding system components 50 and to regulate the operation thereof according to a desired level over the welding cycle, where the sequencer outputs 23 can also be any signal, message, data, etc., provided by the sequencer 10 through any communications means or functional interconnection to one or more system components 50, for example, such as control signals, commands, etc., that cause the components 50 to operate in a certain manner during performance of a welding operation or a particular state thereof. In the illustrated implementation, sequence controller 10 provides a Boolean ON/OFF control output to power source 51, as well as setpoint type values for Work Point (e.g., which can be a wire feed speed in cases where power source 51 ultimately provides a WFS control signal to wire feeder 52, and/or where the waveform state table based control of power source 51 provides for adjustment of a regulated welding voltage output 91 based on wire feed speed values via data table (FIG. 2C)), as well as Arc Length and/or other Arc Control sequencer outputs 23 provided as power source inputs (96 in FIG. 2). Outputs 23 may also be provided directly to wire feeder 52, such as Boolean Wire Feed On/Off and Forward/Reverse controls, as well as Wire Feed Speed values. Other outputs 23 can be provided to various other accessory or peripheral system components 50, for instance, Boolean outputs to Actuate or energize the fume extraction system 56, the gas solenoid 54, the coolant solenoid 55, or the travel carriage 53, and to indicate carriage travel direction, as well as values for carriage travel speed and shielding gas flow rate.

FIG. 5 illustrates an exemplary sequence control state table file 24 in the memory 20 of sequencer 10, which may alternatively be stored in any data store such that table file 24 is accessible by the processing component 12. State table file 24 includes a data file that may be updated easily by downloading into memory 20, where the file 24 is not compiled, and is not machine executable program code, but rather includes a number of entries having parameters, condition checks, instruction indicators, and next state branch fields with which the sequence control program 22 and the processing component 12 (FIG. 1B) can ascertain the proper instructions and/or routines to run for implementing a welding system control strategy on a state by state basis. As best illustrated in FIG. 5, the first sequencer state table file 24 comprises a plurality of sequence control state table file entries 102 that individually correspond to a welding operation state. Each entry 102 has at least one instruction identifier 104 that identifies an executable instruction or routine of the sequence control program 22, and a corresponding instruction parameter 106. One or more exit condition identifiers 108 are provided in the entries 102 corresponding to a welding system condition that is determined according to the current sequencer inputs 21, as well as a next state identifier 110 for each tested exit condition, which indicates a next sequence control state table file entry 102 corresponding to the exit condition identifier 108. The example of FIG. 5 illustrates an integer number L entries 102 (L is an integer greater than 1), with the first entry 102 having J specified exit conditions and corresponding next state indicators 110, and with the last illustrated entry 102 having K conditions. In general, table entries 102 may have one or more instruction indicators 104, one or more parameters 106, whether actual values or links to user interface components (or no parameters for Boolean type instructions or instructions not requiring any value), one or more condition indicators 108, with a next state indicator 110 for specified exit conditions. In addition, action identifiers 112 may optionally be provided in an entry 102 for one or more exit conditions 108, where the action identifier 112 identifies one or more instructions or routines to be executed by the processor 12 when the corresponding condition has been satisfied. Moreover, the exit condition indications 108 may include one or more associated parameters or values (not shown) or any other data suitable for allowing the sequence control program 22 to ascertain whether or not a specified system or process condition exists.

Figure 1B:
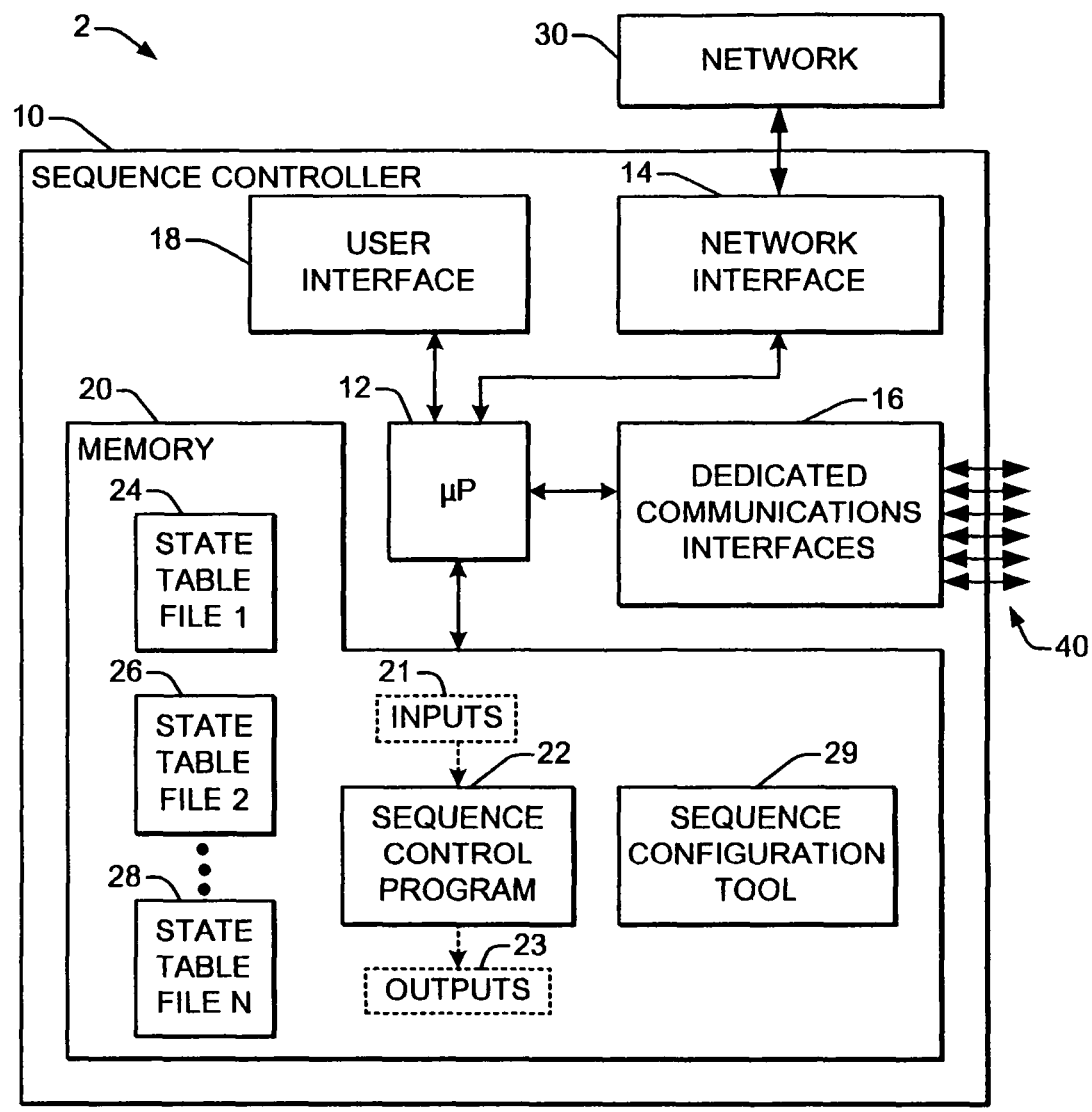
FIG. 1B is a detailed schematic diagram illustrating further details of the exemplary reprogrammable sequence controller of FIG. 1A.
Figure 6:
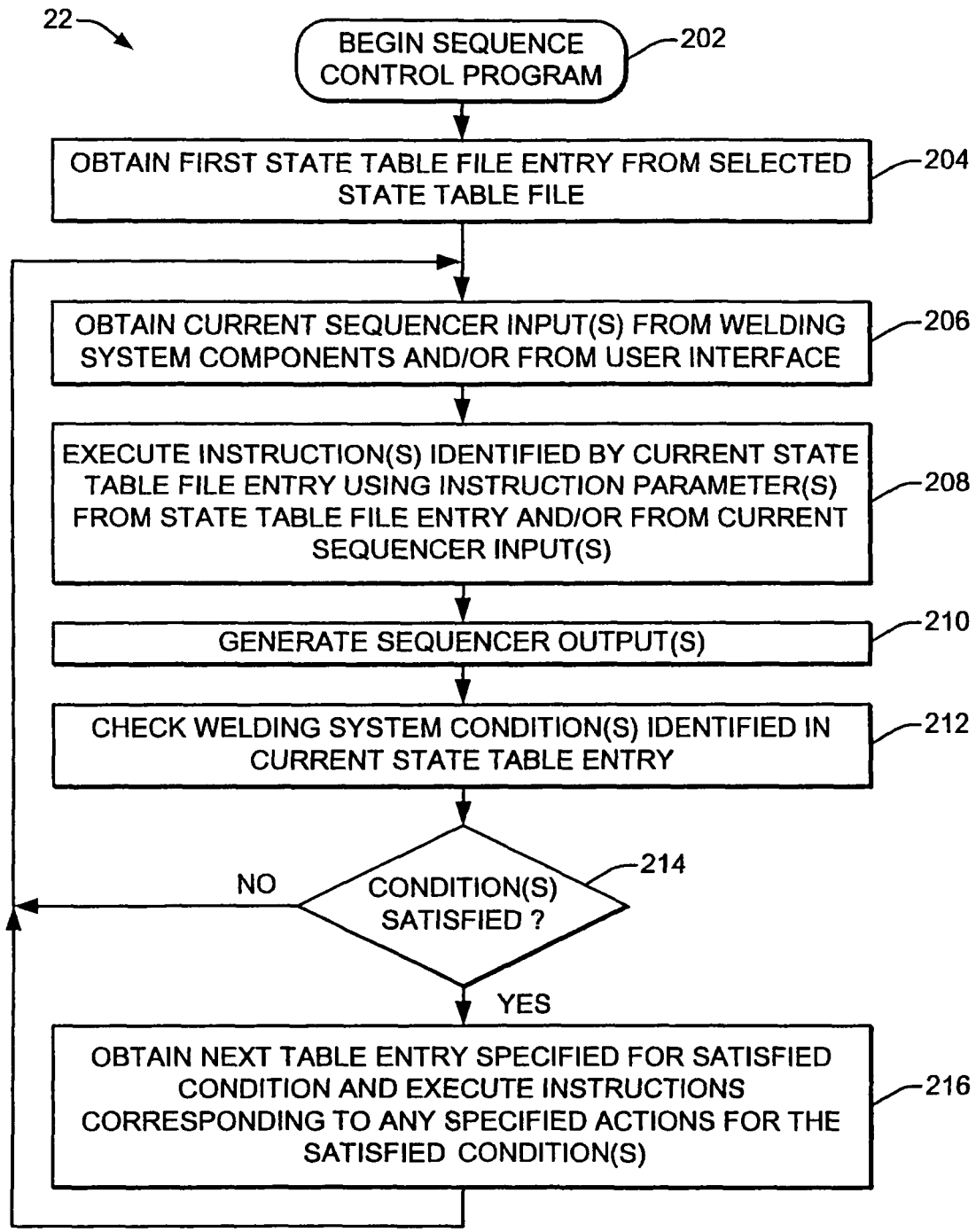
FIG. 6 is a flow diagram illustrating operation of a sequence control program in the sequence controller of FIGS. 1A-2D.

Referring also to FIG. 6, the processor 12 executes sequence control program 22 according to the sequence controller inputs 21 and according to a selected sequence control state table file 24, 26, 28 to provide the sequence controller outputs 23 to perform a welding operation by implementing the designated functions or instructions in state by state fashion, where the condition checks provide for branching to an appropriate next state based on the inputs, timers, etc. In operation, a user selects from the available state table files 24, 26, 28 (e.g., the first table file 24 in one example), using a selection feature on the sequencer user interface 18 (FIG. 1B). Execution of the sequence control program 22 begins at 202 in FIG. 6, where the processing component 12 obtains a current sequence control state table file entry 102 at 204 from the sequence control state table file 24, and obtains current sequence controller inputs 21 from at least one of the welding system component 50 at 206. At 208, the processor 12 executes one or more executable instructions or routines of the control program 22 identified by the instruction identifier(s) 104 of the current entry 102 using one or more instruction parameters 106 thereof and provide the sequence controller outputs 23 at 210. The welding system condition(s) identified by one or more exit condition identifiers 108 of the state table file entry 102 are checked at 212 and a determination is made at 214 as to whether any identified exit conditions are satisfied according to the current sequence controller inputs 21, including any timers associated with the current state. If not, the current state is continued (NO at 214), and the program execution returns to 206-212 as described above. In this manner, the sequence controller 10 implements a state of a given weld sequence according to the state definition in the corresponding table file entry 102 until one or more of the specified exit conditions have been met. Once an exit condition is satisfied (YES at 214), the processor 12 obtains the next sequence control state table file entry 102 at 216 that corresponds to the satisfied exit condition identifier 108. Also, instructions or routines corresponding to any specified action identifiers 112 (FIG. 5) for the satisfied condition are executed at 216. Execution of the control program 22 then returns to obtain the current system inputs 21 at 206, to execute the instructions identified in the new state table file entry 102 and generate corresponding outputs 23 at 208 and 210, respectively, and to check the new state exit conditions at 212 and 214 as described above.

In one possible implementation, the sequencer state table file 24, 26, 28 may be selected or called by a selected power source weld file (power source state file 64, 66, 68, in FIG. 2C above), thereby providing a simple straightforward interface to an operator with the selected weld file determining the appropriate sequencer state table file 24, 26, 28 for use by the sequencer 10. For example, a user may select a weld mode (e.g., CV GMAW) and/or a wire type & size (e.g., 0.035 Steel Pulse), causing a corresponding weld file to be enabled or selected in the power source 51. In this example, the selected weld file in the power source 51 can cause selection of a "GMAW" sequencer table file in sequence controller 10, for example, by suitable messaging between power source 51 and sequencer 10. In this regard, the relationship between weld files and sequencer state table files can be one-to-one, or many-to-one, wherein many weld tables (e.g., of similar type) can call a single sequencer file.

It is noted in FIGS. 1B and 6 that the sequence control program 22 is fairly generic with respect to interoperation with the selected state table file 24, wherein the hard coded instructions and routines of program 22 are those appropriate to interface with and control the various system components 50 and to obtain inputs therefrom, whereas the specific logic of a given welding sequence is provided by the state table file entries 102 and the elements 104-112 thereof. In this manner, the invention essentially decouples the welding sequence logic in the table files 24, 26, 28 from the hard coded executable instructions and routines of the control program 22. Consequently, reconfiguration of an entire welding system 2 can be accomplished without recompiling and installing software or firmware and without hardware modification, as was the case in conventional sequencers (e.g., no need to modify or recompile the sequence control program 22). Instead, a state table file 24, 26, 28 can be constructed and simply stored in memory 20 (or in any suitable data store accessible by the processing component 12) in order to implement a new welding operational sequence. Furthermore, existing state table files 24,26,28 can be used as a starting point or template, with state table file entries 102 being changed, added, or removed therefrom to implement new or modified welding operations using the sequence controller 10. If sequencer state table files 24, 26, 28 are created outside of memory 20, moreover, such files may be easily downloaded to a data store accessible by the processing component 12. In this regard, welding system operators or service personnel may configure the sequence controller 10 and hence an entire welding system 2 from a remote location using the present invention, where the state table files 24,26,28 can be downloaded via network 30 and other networks operationally connected thereto, including LANS, WANS, internet connections, etc. Furthermore, it is noted that the elements 104-112 of state table file entries 102 can be any tags, strings, pointers, addresses, etc. that provide an indication of instructions, routines, numeric values, states, or actions that can be understood by processor 12 when executing the sequence control program 22. Thus, sequence configuration tool 29 (FIG. 1B) can be any suitable hardware, software, firmware, or combinations thereof that can obtain the elements and logic of a welding sequence and create a state table file 24,26,28 and entries 102 thereof which can then be used in performing a welding operation.

In situations involving a large number of automated welding systems each performing the same welding operations, moreover, a single configured state table file 24 can be downloaded to all systems using appropriate network messages, or the file 24 can be downloaded to each machine using a PDA or other device that communicates through a communications interface of the welding machine. In this regard, welding system components 50, such as wire feeders 52, power sources 51, etc., may include a sequence controller 10 along with various communications interfaces and/or user interfaces allowing download of such sequencer state table files 24,26,28 and/or configuration thereof. The sequencer user interface 18 (FIG. 1B) and/or a user interface of another system component 50 (e.g., power source user interface 78 in FIG. 2C) may include knobs, switches, displays, etc., by which one or more of the sequence controller inputs 21 may be provided (e.g., knob setting for wire feed speed during a particular welding sequence state, switch setting to define whether 2 or 4 step trigger is used, etc.), and or the user interface may be operable (e.g., logically linked) to provide instruction parameters 106. For instance, where a state entry 102 calls for regulation of power source output voltage at a crater voltage value, this value may be entered as a constant in the state table file entry 102 as an instruction parameter 106, or the parameter 106 may be linked to a user interface knob or other user interface setting by which an operator may adjust or otherwise control the value ultimately used to provide a control output 23 to the power source 51. FIGS. 10A-11C further illustrate configuration tools and user interface renderings of an exemplary welding sequence for configuring the sequence controller 10 in the system 2.

Figure 7:
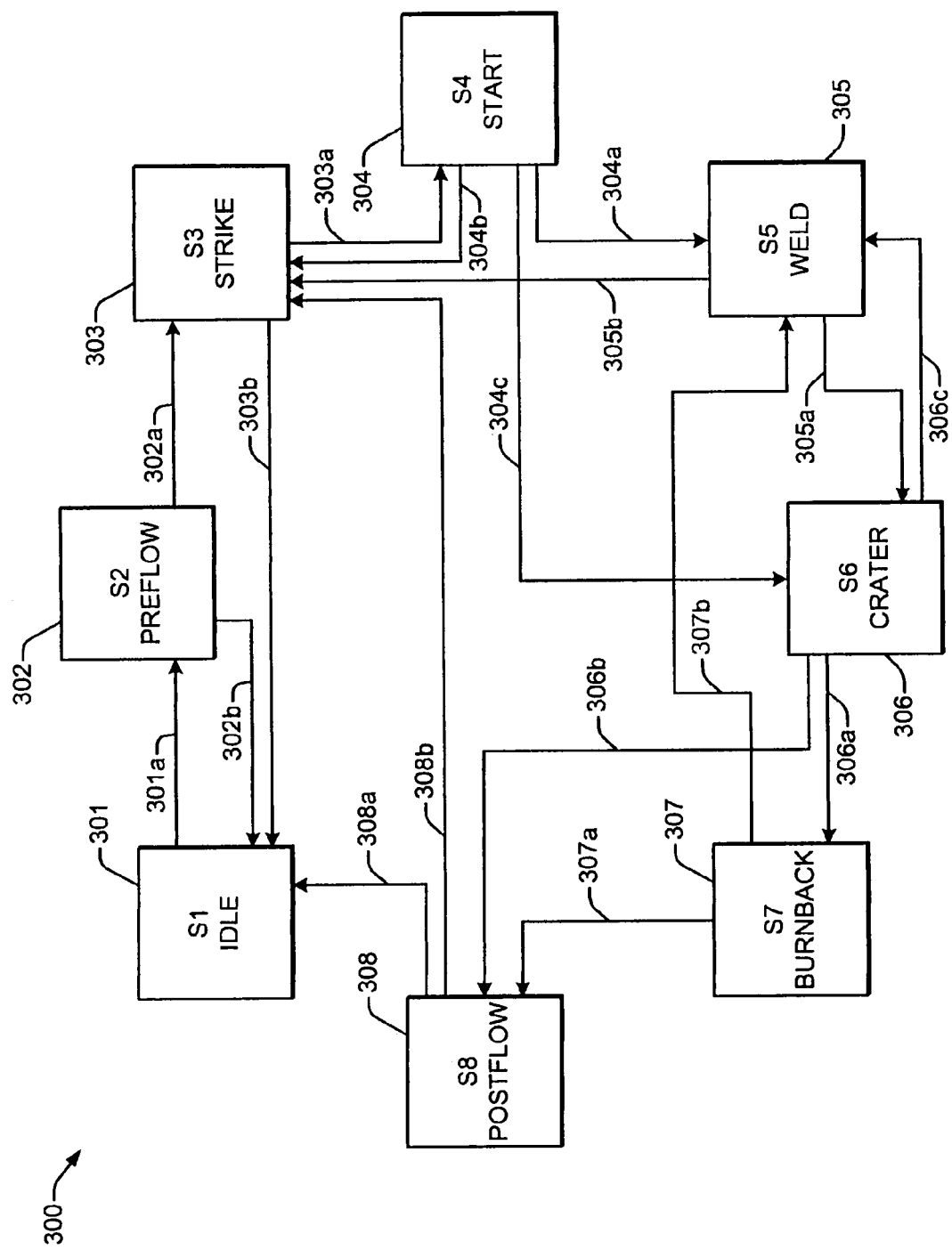
FIG. 7 is a state diagram illustrating various welding system states in an exemplary MIG welding operation.
Figure 8A:
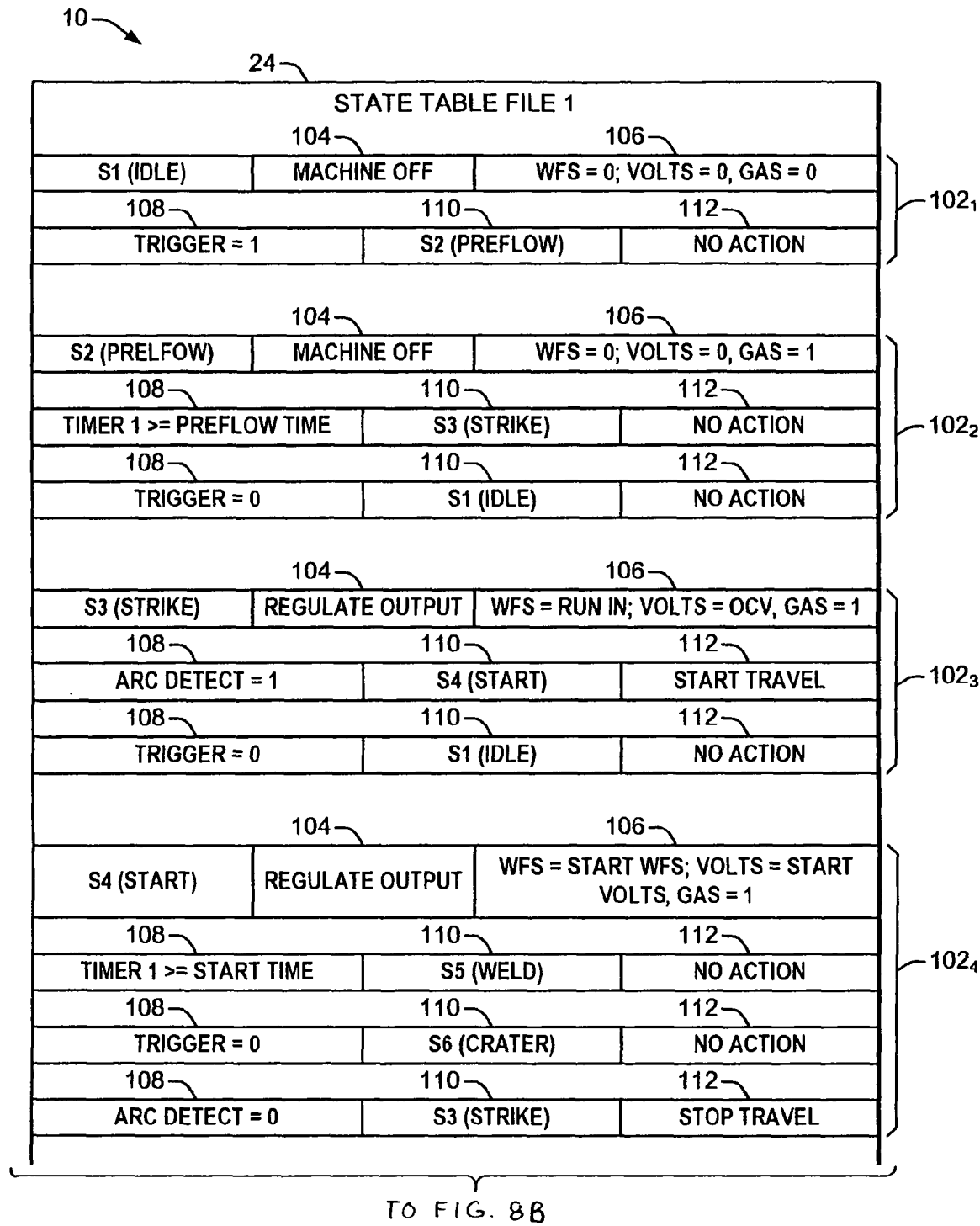
FIGS. 8A-8C illustrate a state table file in the system of FIGS. 1A-2D corresponding to the MIG welding state diagram of FIG. 7.
Figure 8B:
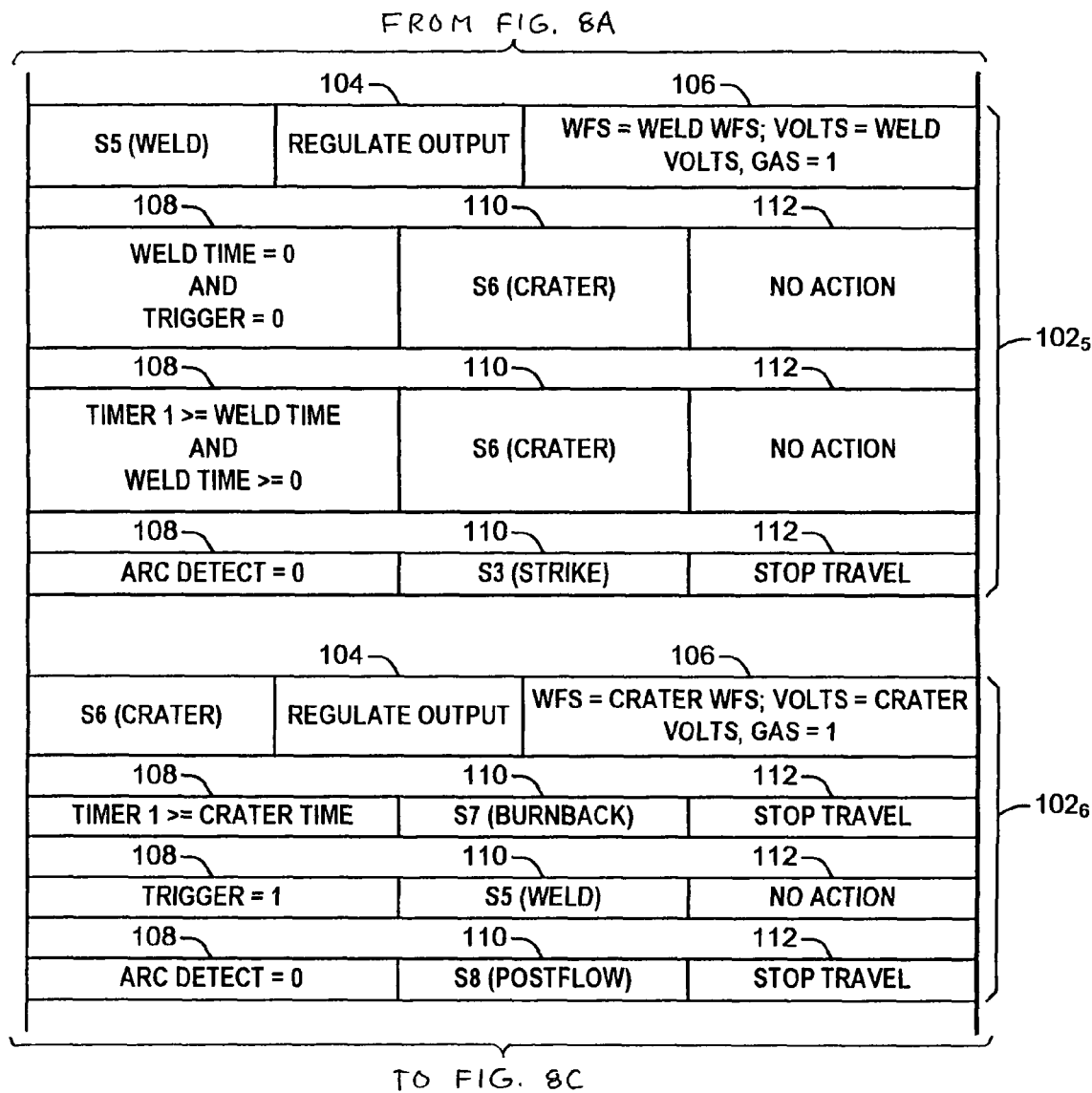
Figure 8C:
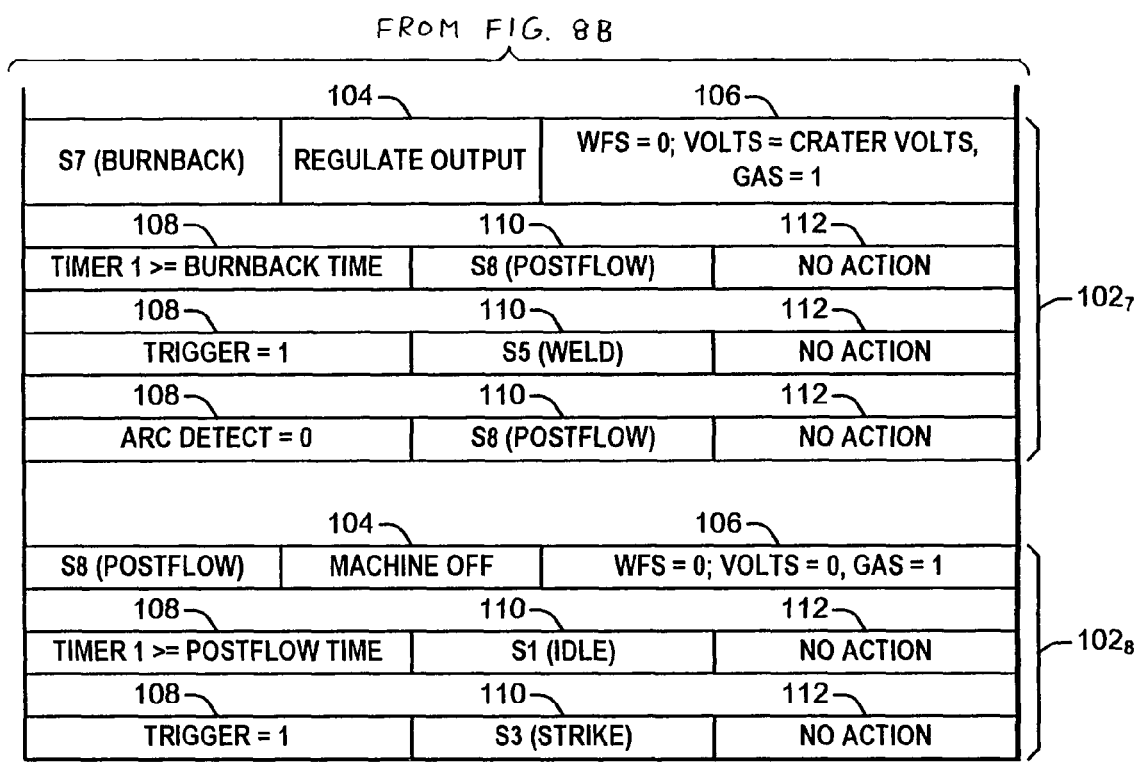
Figure 9:
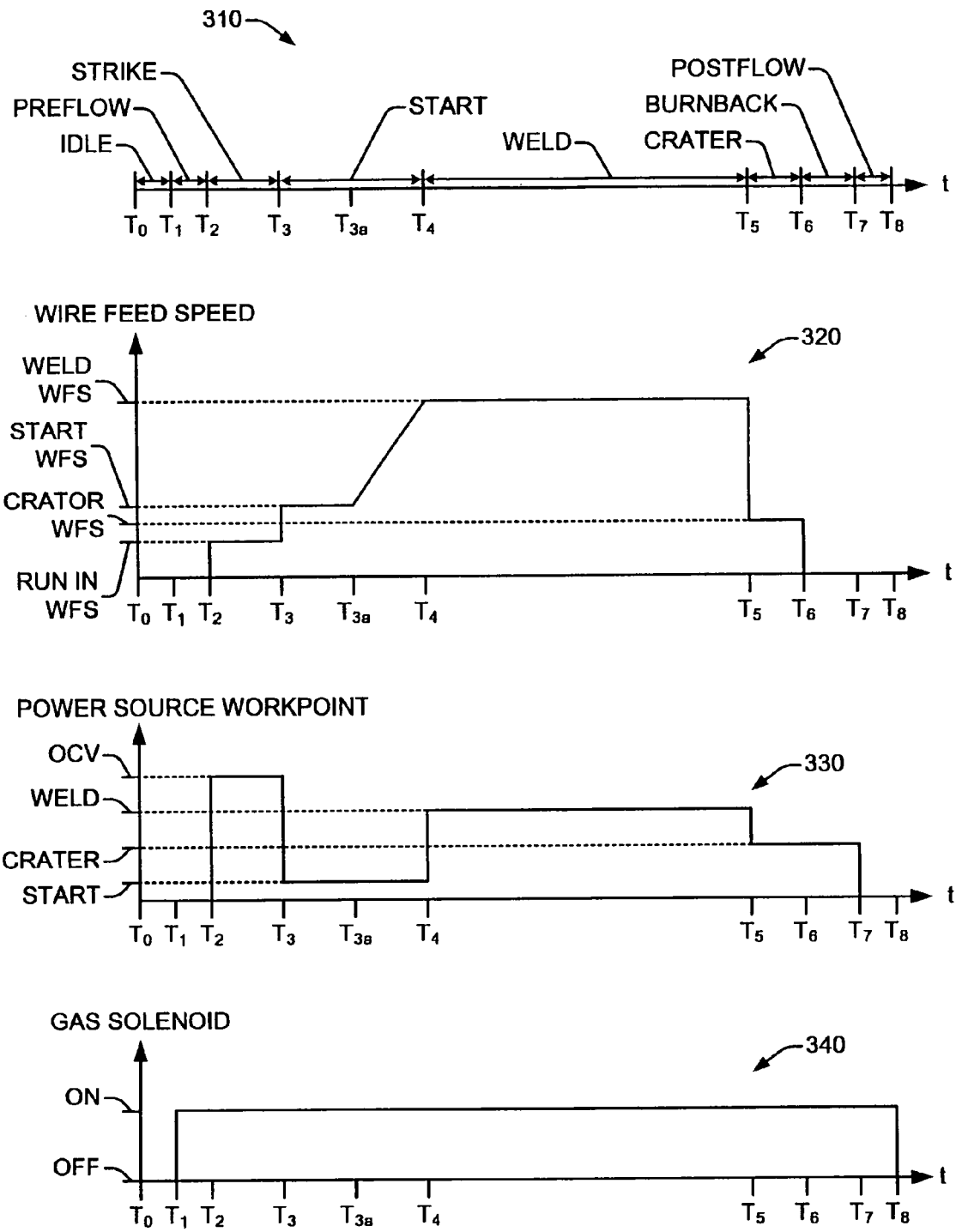
FIG. 9 is a timing diagram illustrating exemplary wire feed speed, power source work point, and gas solenoid sequencer controller outputs and corresponding system states in the exemplary MIG welding operation of FIGS. 7 and 8.

Referring now to FIGS. 7-9, FIG. 7 illustrates a sequence state diagram 300 depicting an exemplary metal inert gas (MIG) welding operation or sequence composed of eight states 301-308 corresponding to an idle state, a preflow state, a strike state, a start state, a weld state, a crater state, a burnback state, and a postflow state, respectively. In FIG. 7, several arrows are provided illustrating transitions from one state to another, wherein the specific branch decisions from the individual states 301-308 and the underlying logic form part of the welding operation definition. As described further below with respect to FIGS. 8A-8C, the exemplary states 301-308 in the sequence state diagram 300 each define one or more exit conditions 108 and associated next state indicators 110, by which one or more arrows are illustrated in FIG. 7 representing the exit conditions and next states. In particular, the weld cycle will transition from the idle state 301 to the preflow state 302 (branch 301a) when an operator presses a welding trigger, and from there to either the strike state 303 (branch 302a) after a preflow time or back to the idle state (branch 302b) if the trigger is released. From the strike state 303, the weld operation proceeds to the start state 304 (branch 303a) if an arc is detected, or will instead revert to the idle state 301 (branch 303b) if the trigger is released. Several possible branches 304a-304c are defined for the start state 304, whereby the welding cycle proceeds to one of the weld state 305, the strike state 303, or the crater state 306, based on expiration of a start time, loss of trigger, or loss of arc, respectively. From the weld state 305, the process either proceeds to the crater state 306 (branch 305a) or returns to the strike state (branch 305b), and from the crater state 306, the cycle either proceeds to the bumback state 307 (branch 306a) or to the posfflow state 308 (branch 306b). The burnback state 307 provides for condition branching either back to the weld state 305 (branch 307b) or to the posfflow state 308 (branch 307a), while the postflow state 308 provides for conditional branching to the idle state (branch 308a) or to the strike state 303 (branch 308b), wherein the above conditional branching (next state) conditions are described in greater detail below with respect to FIGS. 8A-8C for the illustrated MIG welding process.

FIGS. 8A-8C show the exemplary first state table file 24 in the sequence controller 10 of FIG. 1B, configured to perform the MIG welding sequence 300 of FIG. 7, with the table file 24 including eight state table entries $102_1$-$102_8$ corresponding to the welding operational states 301-308, respectively. The table file 24, and the entries 102 thereof are stored in linear fashion in memory 20 of sequence controller 10, with each element thereof being stored at a corresponding address, whereby table file 24 can be stored in any suitable memory device or other storage medium and accessed easily by processor 12 or other processing component. Thus, the file 24 and other state table files of the present invention are not stored in multi-dimensional array or spreadsheet fashion, wherein the next state is derived from the table entries 102 and the specified conditions 108 and corresponding next state indicators 110 thereof, rather than by ascertaining an intersection of a row and column in a spreadsheet format. Thus, the invention provides significant advantages with respect to the ability to provide a fairly straightforward sequence control program 22 (FIGS. 1B and 6 above), while allowing easy reprogramming of the sequencer 10.

FIG. 9 illustrates timing diagrams 310, 320, 330, and 340 showing the various states of this MIG operation along with wire feed speed, power source work point, and gas solenoid sequencer controller outputs. In this MIG welding example, once the operator actuates the trigger from the idle state 301, a preflow 302 is performed in which the gas solenoid 55 turns on prior to activating the power source output, and once a preflow time has passed, a 'run-in' is performed in a strike state 303 where the power source output is set to an open circuit voltage level (OCV) and the wire is feed to the process at a low run-in speed until an arc is detected between the welding wire and a workpiece being welded. Upon detecting the arc, a start state 304 begins, which is typically performed for a specified time period, after which the wire feed speed is increased to a weld WFS rate and the power source output is brought to a weld level in a weld state 305. If the trigger is released, the process initiates a crater state 306 at a lower wire feed speed work point for a crater time period and from there transitions to a burnback state 307 where the wire feed rate is brought to zero while the power source 51 maintains the crater state voltage level for a time to burn back a portion of the welding wire. After burnback, a postflow state 308 is performed with the shielding gas maintained for a short time with zero power source output and zero wire feed speed, after which control returns to the idle state 301. The above description is directed to a typical sequence in the MIG welding operation, wherein other sequences may occur under various conditions, for example, where an operator lets go of the torch trigger during certain of the above described states.

As shown in FIG. 8A, the first state entry $102_1$ corresponds to the idle state 301 in which the power source 51 is off (output at zero volts), no shielding gas is provided (gas solenoid 55 in FIG. 1A is off) and the wire feed speed (WFS) is zero. This idle state 301 will generally be the first state implemented by the sequence controller 10, and will continue until an operator actuates a trigger on a welding torch. Accordingly, the entry $102_1$ includes an instruction identifier 104 indicating "MACHINE OFF", which may be a character string, tag, numeric value, etc., by which the processor 12 can determine specific instructions and/or routines of the sequence control program 22 to execute during the idle state of the MIG welding sequence. The entry $102_1$ also includes corresponding instruction parameters 106, indicating that the wire feed speed WFS=0, the power source output voltage VOLTS=0 and that the gas flow control solenoid is to be closed (GAS=0). To provide for selective exiting of the idle state, the entry $102_1$ includes an exit condition indicator 108 "TRIGGER=1", where the processor 12 and sequence control program 22 will check the trigger state input 21 to ascertain whether the trigger has been actuated (e.g., "1" for actuated, "0" otherwise). Entry $102_1$ also provides a corresponding next state indicator 110, indicating that when the condition (trigger actuated) has been satisfied, the next state will be the preflow state 302. FIG. 10A below illustrates an exemplary user interface rendering of the state table entry $102_1$ for the MIG welding idle state. As shown in FIG. 9, the idle state 301 begins in this example at time $T_0$ and continues until the trigger is pulled at time $T_1$ in the state timing diagram 310, during which interval the wire feed speed is maintained at zero (WFS diagram 320 in FIG. 9), the power source workpoint output is at zero volts (power source workpoint diagram 330) and the gas solenoid is off (gas diagram 340 in FIG. 9).

For the preflow state 302, the state table 24 includes a second entry $102_2$ including a machine off instruction indicator 104 and parameters 106 specifying WFS=0 VOLTS=0 and GAS=1. Exit conditions for the preflow state 302 are specified by timer indicator 108 testing whether a timer 1 is greater than or equal to a preflow time 108, wherein the processing component 12 will start timer 1 at time $T_1$ in the diagram of FIG. 9 based on the condition indicator 108 and will thereafter check whether this timer value exceeds a preflow time. The indicator 108 in this case can provide a fixed or constant preflow time, or may alternatively specify a user interface link whereby the preflow time is obtained from one or more user knobs or other user settings on the sequencer interface 18 (FIGS. 1B and 11A-11C). For this specified exit condition, a next state indicator 110 is provided in the entry $102_2$ indicating the strike state 303. A second exit condition indicator 108 is provided in the entry 102₂ causing the processing component 12 to check whether the operator trigger has been released (trigger=0), with a corresponding next state indicator 110 indicating a conditional branch to the first idle state 301 if this condition is satisfied. In this manner, the preflow state 302 continues from time $T_1$ for a duration equal to the preflow time and completes at time $T_2$ in FIG. 9, unless the operator releases the trigger. Should the operator release the trigger (trigger=0), the weld operation returns to the idle state 301 until the operator subsequently reactivates the trigger and the sequence begins again as described above. Otherwise, at the expiration of the preflow time (e.g., timer 1 is greater than or equal to the preflow time), processing component 12 will obtain the entry 102₃ corresponding to the indicated next state, in this case strike state 303. As shown in timing diagrams 320, 330, 340, for the duration of the preflow state 302 between times $T_1$ and $T_2$, the wire feed speed is maintained at zero, the power source work point is maintained at 0 volts, and the gas solenoid is turned on.

The strike state 303 begins at $T_2$ with the wire feed speed being raised to a "run in" WFS and with the power source output being raised to an open circuit voltage (OCV) while the gas remains on (gas=1). As shown in FIG. 8A, the state table file entry 102₃ corresponding to the strike state 303 includes a "regulate output" instruction indicator 104, with parameters 106 specifying WFS=run in, volts=OCV, and gas=1. For this state, a first exit condition indicator 108 directs the processing component 112 to determine whether an arc has been detected in the welding process (arc detect=1). If so, the process will proceed to the start state 304 as indicated by the corresponding next state indicator 110. Upon this condition being satisfied, moreover, an action indicator 112 is provided in the entry 102₃ telling processing component 12 to actuate a travel carriage 53 (FIG. 1, "start travel" action). As shown in FIG. 9, this situation occurs at time $T_3$ upon detection of a welding arc. Otherwise, the strike state 303 can be ended earlier if the user releases the welding trigger, wherein entry 102₃ includes a second exit condition selectively causing execution to return to the idle state 301.

The start state 304 begins at time $T_3$ (FIG. 9), wherein FIG. 8A illustrates a corresponding fourth entry 102₄. The start state entry 102₄ includes a regulate output instruction indicator 104 along with parameters 106 calling for wire feed speed to be set to a "start WFS", output volts to be set to a "start voltage", and shielding gas to be maintained on. Accordingly, the wire feed speed is raised to a start WFS value at time $T_3$ as shown in timing diagram 320 of FIG. 9, and the power source output voltage is reduced to a start voltage level as shown in timing diagram 330. The entry 102₄ in FIG. 8A, moreover, includes three specified exit condition indicators 108 along with corresponding next state indicators 110. The first condition involves timer 1, wherein the timer is tested against a specified start time, which can be a constant value entered directly into state table 24, or the start time may be obtained from a sequencer input 21, such as a user interface knob or other setting. As with the other timer based condition checks, timer 1 is reset at the beginning of the start state 304 and the processing component 12 compares the timer value with the specified start time, wherein, if the timer valve equals or exceeds the start time, the MIG welding process will proceed to the welding state 305. Other exit conditions include the user releasing the trigger (in which case execution proceeds directly to a crater state 306), as well as a loss of arc condition (arc detect=0), for which condition the travel carriage is stopped and the welding sequence returns to the strike state 303. In FIG. 9, the wire feed speed timing diagram 320 indicates that timer 1 equals or exceeds the start time at time $T_{3a}$ at which point the wire feed speed begins ramping up from the start WFS to a weld WFS at time $T_4$. During the entire time between $T_3$ and $T_4$, moreover, the power source workpoint output voltage is maintained at the start voltage level (diagram 330) and the gas solenoid is maintained on (timing diagram 340). It is noted at this point, however, that while the exemplary welding sequence is illustrated in FIG. 9 as having the weld state 305 begin at time $T_4$, other implementations are possible wherein weld state 305 alternatively begins at time $T_{3a}$, wherein the wire feed speed may be increased more immediately to the weld WFS (without ramping).

Referring also to FIG. 8B, an entry 102₅ specifies operation for the weld state 305, again including a regulate output instruction indicator 102, with corresponding instruction parameters 106 specifying wire feed speed at weld WFS, power source output voltage at weld volts, and shielding gas maintained on. For this state 305, three exit condition indicators 108 and corresponding next state indicators 110 are provided, including a first exit condition indicator 108 specifying weld time=0 and trigger=0. For the illustrated MIG weld sequence, a non-zero weld time setting in the weld state 305 causes a spot time function to be engaged, wherein the weld timer defines the weld duration once the cycle is started. In this regard, if the weld time input 21 (e.g. user interface knob setting establishing weld time) equals zero and the trigger is released, the process proceeds to the sixth crater state 306. If a timer value timer 1 is greater than or equal to a "weld time" (as provided by a constant value in the entry 102₅ or as link to a user interface knob setting), and if the weld time is greater than or equal to 0, the process also proceeds to the crater state 306. Another exit condition indicator 108 provides that if arc detect=0 (welding arc is lost), the travel carriage is stopped and the process returns to the strike state 304. As shown in FIG. 9, weld state 305 begins at time $T_4$ with the wire feed speed at a high weld WFS rate and with the power source output being regulated at a weld voltage, as shown in timing diagrams 320 and 330. In the example of FIG. 9, this weld state 305 continues from time $T_4$ until a later time $T_5$ at which the operator releases the torch trigger.

The crater state begins at time $T_5$ and extends to time $T_6$ in FIG. 9, with the wire feed speed being significantly reduced at time $T_5$ to a crater WFS value (diagram 320) and with the power source output being reduced to a crater voltage setting (diagram 330). Although not illustrated in the exemplary state table file 24, a ramp function may be provided that defines a ramp down function to smoothly transition the weld output (power source workpoint) from the weld output level to the crater output as the sequence transitions to the crater state 306, wherein any type of instructions and corresponding state table file entry instruction indicators are contemplated within the scope of the invention. The corresponding table entry 102₆ in FIG. 8B includes a regulate output instruction indicator 104, and instruction parameters 106 specifying wire feed speed at crater WFS, output voltage at crater volts, and gas=1. The crater state entry 102₆ includes three specified exit conditions and corresponding indicators 108, along with next state indicators 110, wherein the first specified exit condition also has an action identifier 112. The first condition indicator 108 specifies that crater state 306 ends when a timer 1 is greater than or equal to a crater time, in which case the next state is specified as the burnback state 307, with an associated exit condition action stop travel (in which case processing component 12 will generate sequencer outputs 23 to cause travel carriage 53 to cease motion (FIG. 1A)). Crater state 306 will also end if the user again actuates the torch trigger, in which case the sequence returns to the weld state 305 as described above. In addition, if arc detect=0 (indicating loss of welding arc), the travel carriage is stopped and the sequence proceeds to an eighth state postflow 308, as described below.

Referring also to FIG. 8C, an entry 102₇ is provided for the seventh bumback state 307, including an instruction indicator 104 for regulating the welder output, along with instruction parameters 106 specifying wire feed speed=0, volts=crater volts, and gas=1. In this regard, as shown in FIG. 9, the burnback state 307 begins at time $T_6$ and extends to time $T_7$, during which time the wire feeder stops, and the power source maintains the output voltage at the crater volts setting. The table entry 102₇ also includes an exit condition 108 and corresponding next state indicator 110 indicating that if timer 1 equals or exceeds a burnback time (an input link, or a constant value, etc.), the MIG welding sequence will proceed to the postflow state 308. In this situation, the arc is maintained by virtue of power supply regulating the output voltage at the crater volts setting along with provision of shielding gas, with no wire feed speed such that a portion of the welding wire is burned back from the work piece (not shown). Other exit conditions are specified in the entry 102₇, including the user reactivating the torch trigger (process returns to weld state 305), and loss of welding arc (arc detect=0), in which case execution also goes to the postflow state 308 (posfflow state 308 begins at time $T_7$ in FIG. 9. The state table file 24 (FIG. 8C) includes a corresponding posfflow table entry 102₈ with an instruction indicator 104 which directs that the machine be turned off, in which case the processing component 12 causes the wire feed speed to be set to 0 and the output voltage to be set to 0 while maintaining gas flow on, as indicated by instruction parameters 106 in entry 102₈. This condition is maintained for a postfow time wherein entry 102₈ includes a first exit condition 108 indicating that timer 1 is compared with a postflow time, and if the timer valve exceeds or equals the postflow time, the system 2 returns to the idle state 301 as described above, at which point the gas solenoid will be turned off as indicated at time $T_8$ in timing diagram 340 of FIG. 9. Otherwise, if the user reactivates the torch trigger prior to expiration of the posfflow time, the sequence returns to the strike state 303 as described above.

Figure 11A:
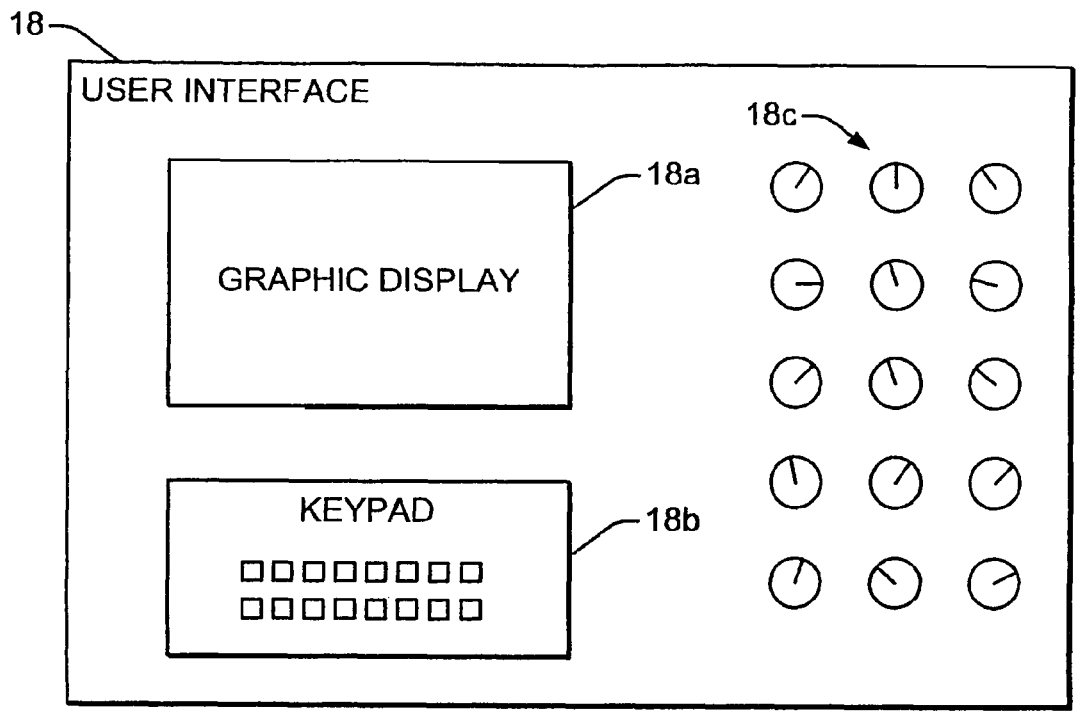
FIGS. 11A-11C illustrate an exemplary graphical user interface with a graphic display and user controls for rendering individual sequence control state table file entries to a user for allowing the user to select or set various instruction identifiers, parameters, exit condition identifiers, and next state identifiers for the table file entries.
Figure 11B:
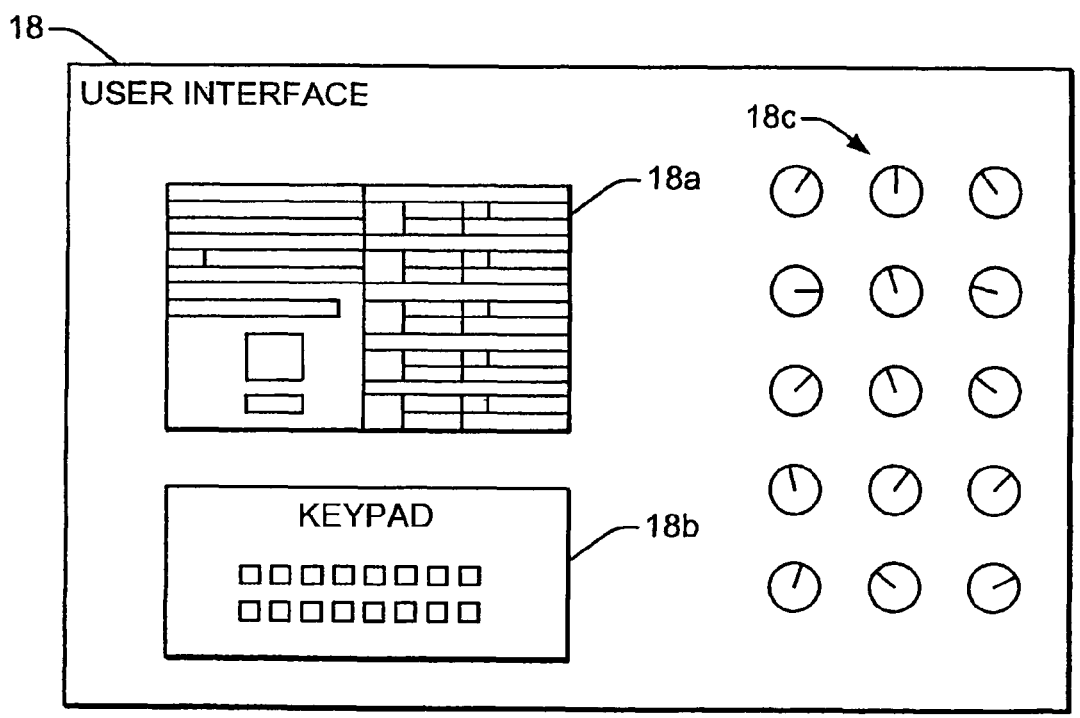
Figure 11C:
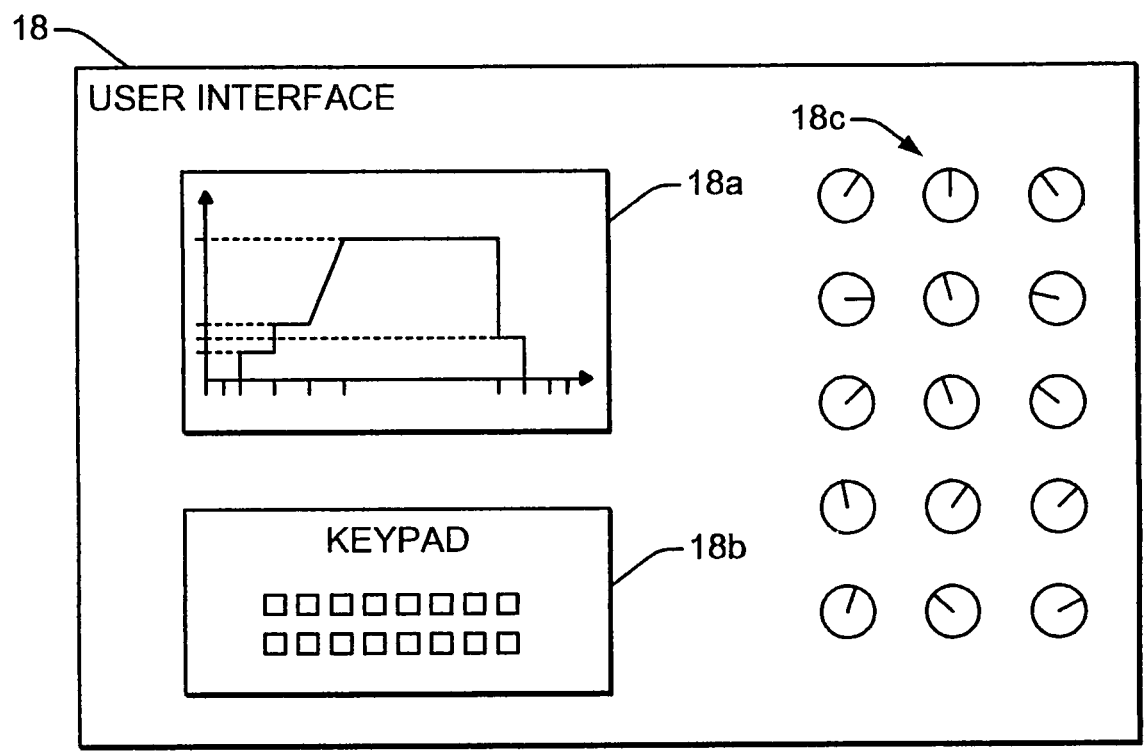

Referring now to FIGS. 10A-10H and 11A-11C, as described above, the welding system 2 includes various user interfaces (sequencer interface 18 in FIG. 1B, power source interface 78 in FIG. 2C). The sequence controller 10, moreover, includes a sequence configuration tool 29, in one example a software program or application residing in sequencer 20 and operable by processing component 12 and user interface 18. In this example, an operator may access and interact with the sequence configuration tool 29 via the user interface 18 and processing component 12 (FIG. 1B). Interface 18 may be any type of user interface apparatus, for example including means such as a display, auto enunciators, etc., for rendering information to an operator as well as one or more input devices (knobs, keypad, buttons, switches, audio receivers, mouse, other pointing devices, etc.) for receiving information from an operator. The sequence configuration tool 29 cooperatively interacts with user interface 18 to allow a user to modify a sequence control state table file 24, 26, 28, or to create new sequence control state table files and to store new or modified table files 24, 26, 28 in a data store accessible by the processing the component 12, in this case, in memory 20. One example is shown in FIGS. 11A-11C in which the sequence controller user interface 18 includes a display 18a that may be a graphic display along with a keypad 18b and various user knobs 18c. One or more pointing devices (e.g. mouse, track ball, touch pad, etc., not shown) may also be provided in order to navigate or otherwise position a cursor indicator on the screen 18a. FIGS. 10A-10H show display renderings 410 through 480 corresponding to state table file entries 102₁ through 102₈ respectively, described above. In FIG. 10A, for example, the idle state entry 102₁ is presented on the user interface display screen 18a, wherein FIG. 11B illustrates the appearance of this state entry rendering in sequencer user interface 18. In this example, the interface 18 and the display 18a thereof render individual sequence control state table file entries 102 to a user and allow the user to select and modify one or more of the instruction identifier ("machine off" in FIG. 10A), and also to set or otherwise link one or more instruction parameters 106, for example using a constant value entry or a link with an adjustable user interface control component such as knobs 18c. In this example, the wire feed speed (WFS) is set to a constant value of 0 along with the volts and gas solenoid parameters in the lower left portion of the display rendering 410. Similar instruction indicator and instruction parameter fields are illustrated in the renderings of 420-480 in FIGS. 10B-10H for the remaining state entries 102₂-102₈. In addition, the renderings 410-480 illustrate state fields allowing a user to enter the various exit condition indicators and any corresponding exit action indicator 112, for example as shown in FIG. 10F. Also, next state indicators fields are provided in the renderings 410-480 allowing the user to select or otherwise specify the next state to be executed upon satisfaction of a corresponding exit condition indicator. In one possible implementation, the user interface 18 may provide for drop down menus associated with any of the fields illustrated in the renderings 410-480 whereby a user may select from a list of possible values or links or other associations for a given state table entry element 104-112. For instance, in the instruction indicator field of the renderings 410-480, a drop down menu (not shown) may be actuatable by a user (for example by double clicking on the corresponding field using a pointing device such as a mouse), wherein a list of the possible instructions may be provided to the user to select from. In other fields, such as those associated with the instruction parameter 106 (WFS, volts, gas, etc.), clicking on or otherwise actuating such field may cause the display 18a to render a list to the user showing possible links to user interface knobs 18c or other user interface setting apparatus, as well as providing the user with an option to set a constant value for one or more parameters 106. Likewise, a drop down menu may be provided for defining exit conditions and or actions associated therewith. For example, if a user clicks on a condition check field in the upper right portion of the renderings of 410-480, menu driven window may be displayed allowing a user to specify a user interface knob 18c or other user interface setting apparatus, the value of which will be used in comparison logic to ascertain whether a sequencer input 21 has reached the knob setting value. With respect to exit condition action identifier 112, the rendering 410-480 may further provide drop down menus or other user accessible listings of possible actions when a given exit condition has been satisfied, in similar fashion to those provided for specifying the instruction fields. Moreover, drop down menus or other similar functionality may be provided for selecting from a list of possible branch to conditions, for defining the next state indicators 110 in table file entries 102.

Referring also to FIG. 11C another possible implementation involves graphic display adaptation of sequence controller configuration in a graphical rendering environment. In this case, FIG. 11C illustrates rendering of a wire feed speed profile curve similar to diagram 320 of FIG. 9 above, wherein the wire feed speed profile and various time references and wire feed speed level references are rendered to the user on the display 18a. In this case the user may drag various points in the displayed wire feed speed curve up or down to change wire feed speed values and or left or right to change various time references setting state durations whereby the programming or configuration tool 29 may adapt the corresponding timer value definitions or settings in the various state entries 102 based on the users modification of the graphical rendering. In this case, the user may be provided with the opportunity to make such adjustments with respect to one or more system conditions, including but not limited to wire feed speed, power source workpoint output, travel carriage speed, etc. For example, the welding power source current may be rendered on the display 18a for a GTAW system, with the user being provided with interface tools by which the current levels and relevant time points could be modified graphically and/or through entry of corresponding state table entries. Furthermore, the user interfaces may be operated in conjunction with a waveform tool such as Lincoln's WaveDesigner software for setting parameters of the welding power source output.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A welding system for performing a welding operation, said welding system comprising:
   a plurality of welding system components including a power source operative to provide a welding signal to a welding process; and
   a reprogrammable sequence controller receiving one or more sequence controller inputs from at least one welding system component and providing one or more sequence controller outputs to at least one welding system component, said sequence controller comprising:
      a processing component,
      a sequence control program accessible by said processing component, and
      a sequence control state table file accessible by said processing component, said sequence control state table file including a plurality of sequence control state table file entries, each of said sequence control state table file entries corresponding to a welding operation state and comprising:
         an instruction identifier that identifies an executable instruction or routine of said sequence control program,
         an instruction parameter corresponding to the executable instruction or routine identified by said instruction identifier,
         an exit condition identifier corresponding to a welding system condition, and
         a next state identifier indicating a next sequence control state table file entry corresponding to said exit condition identifier,
   wherein said processing component executes said sequence control program according to said sequence controller inputs and according to said sequence control state table file to provide said sequence controller outputs to perform a welding operation by said welding process.

2. A welding system as defined in claim 1, wherein said processing component obtains a current sequence control state table file entry from said sequence control state table file, obtains current sequence controller inputs from at least one of said welding system component, executes one or more executable instructions or routines of said sequence control program identified by an instruction identifier of said current sequence control state table file entry using an instruction parameter of said current sequence control state table file entry to provide said sequence controller outputs, determines whether a welding system condition identified by an exit condition identifier of said current sequence control state table file entry is satisfied according to said current sequence controller inputs, and selectively obtains a next sequence control state table file entry corresponding to said exit condition identifier if said welding system condition identified by said exit condition identifier of said current sequence control state table file entry has been satisfied.

3. A welding system as defined in claim 1, wherein said sequence control state table file is downloadable to a data store accessible by said processing component.

4. A welding system as defined in claim 1, comprising a user interface component providing at least one of said sequence controller inputs.

5. A welding system as defined in claim 1, comprising a user interface component providing said instruction parameter.

6. A welding system as defined in claim 1, wherein said sequence controller is integrated into one of said welding system components.

7. A welding system as defined in claim 1, further comprising a user interface component and a sequence configuration tool operatively coupled with said user interface component, said sequence configuration tool allowing a user to modify said sequence control state table file or to create new sequence control state table files and to store new or modified sequence control state table files in a data store accessible by said processing component.

8. A welding system as defined in claim 2, wherein said sequence control state table file entries further comprise an action identifier corresponding to said exit condition identifier, said action identifier identifying an executable instruction or routine of said sequence control program, wherein said processing component selectively executes said executable instruction or routine identified by said action identifier if said welding system condition identified by said exit condition identifier of said current sequence control state table file entry has been satisfied.

9. A welding system as defined in claim 4, wherein said user interface component provides said instruction parameter.

10. A welding system as defined in claim 6, wherein said sequence controller is integrated into a wire feeder component of said welding system.

11. A welding system as defined in claim 7, wherein said user interface component comprises a graphical user interface with a display adapted to render individual sequence control state table file entries to said user, and to allow said user to select said instruction identifier, to set said instruction parameter or to link said instruction parameter with an adjustable user interface control component, to set said exit condition identifier and to set said next state identifier for each said sequence control state table file entry.

12. A welding system as defined in claim 7, wherein said user interface component comprises a graphical user interface with a display adapted to graphically render a welding operation including a plurality of welding system states corresponding to a sequence control state table file to said user, and to allow said user to graphically modify said graphical rendering to modify parameters, conditions, or instruction identifiers of one or more entries to modify said sequence control state table file or to create new sequence control state table files.

13. A reprogrammable sequence controller for controlling a plurality of welding system components to perform a welding operation, said sequence controller comprising:
 a processing component receiving one or more sequence controller inputs from at least one welding system component and providing one or more sequence controller outputs to at least one welding system component;
 a sequence control program accessible by said processing component; and a sequence control state table file accessible by said processing component, said sequence control state table file including a plurality of sequence control state table file entries, each of said sequence control state table file entries corresponding to a welding operation state and comprising:
  an instruction identifier that identifies an executable instruction or routine of said sequence control program,
  an instruction parameter corresponding to the executable instruction or routine identified by said instruction identifier,
  an exit condition identifier corresponding to a welding system condition, and
  a next state identifier indicating a next sequence control state table file entry corresponding to said exit condition identifier;
wherein said processing component executes said sequence control program according to said sequence controller inputs and according to said sequence control state table file to provide said sequence controller outputs to perform a welding operation.

14. A sequence controller as defined in claim 13, wherein said processing component obtains a current sequence control state table file entry from said sequence control state table file, obtains current sequence controller inputs from at least one of said welding system component, executes one or more executable instructions of said sequence control program identified by an instruction identifier of said current sequence control state table file entry using an instruction parameter of said current sequence control state table file entry to provide said sequence controller outputs, determines whether a welding system condition identified by an exit condition identifier of said current sequence control state table file entry is satisfied according to said current sequence controller inputs, and selectively obtains a next sequence control state table file entry corresponding to said exit condition identifier if said welding system condition identified by said exit condition identifier of said current sequence control state table file entry has been satisfied.

15. A sequence controller as defined in claim 13, comprising a user interface component providing at least one of said sequence controller inputs.

16. A sequence controller as defined in claim 13, comprising a user interface component providing said instruction parameter.

17. A sequence controller as defined in claim 13, further comprising a user interface component and a sequence configuration tool operatively coupled with said user interface component, said sequence configuration tool allowing a user to modify said sequence control state table file or to create new sequence control state table files and to store new or modified sequence control state table files in a data store accessible by said processing component.

18. A sequence controller as defined in claim 17, wherein said user interface component comprises a graphical user interface with a display adapted to render individual sequence control state table file entries to said user, and to allow said user to select said instruction identifier, to set said instruction parameter or to link said instruction parameter with an adjustable user interface control component, to set said exit condition identifier and to set said next state identifier for each said sequence control state table file entry.

19. A tool for configuring a sequence controller in a welding system, said tool comprising:
 a user interface for rendering sequence control state table file entries to a user, each of said sequence control state table file entries comprising
  an instruction identifier that identifies an executable instruction or routine of a sequence control program,
  an instruction parameter corresponding to the executable instruction or routine identified by said instruction identifier,
  an exit condition identifier corresponding to a welding system condition, and
  a next state identifier indicating a next sequence control state table file entry corresponding to said exit condition identifier;
said tool being adapted to allow said user to modify said entries, to create or modify a sequence control state table file and to store said sequence control state table file.

20. A tool as defined in claim 19, wherein said user interface comprises a display adapted to render individual sequence control state table file entries to said user, and to allow said user to select said instruction identifier, to set said instruction parameter or to link said instruction parameter with an adjustable user interface control component, to set said exit condition identifier, and to set said next state identifier for each said sequence control state table file entry.

21. A tool as defined in claim 19, wherein said user interface comprises a graphic display.

22. A tool as defined in claim 21, wherein said user interface is integrated into a welding system power source or wire feeder component.

* * * * *